(12) United States Patent
Hanzel et al.

(10) Patent No.: US 10,825,476 B2
(45) Date of Patent: Nov. 3, 2020

(54) SPINDLE MOTOR

(71) Applicant: Minebea Mitsumi Inc., Nagano-ken (JP)

(72) Inventors: Sendy Hanzel, Aldingen (DE); Tobias Imberger, Engen (DE); Christoph Fluck, Blumberg (DE); Hideaki Showa, Nagano (JP); Daigo Nakajima, Nagano (JP); Tetsuo Kitamura, Nagano (JP)

(73) Assignee: MINEBEA MITSUMI INC., Nagano-ken (JP)

( * ) Notice: Subject to any disclaimer, the term of this patent is extended or adjusted under 35 U.S.C. 154(b) by 0 days.

(21) Appl. No.: 16/675,607

(22) Filed: Nov. 6, 2019

(65) Prior Publication Data

US 2020/0143832 A1 May 7, 2020

(30) Foreign Application Priority Data

Nov. 7, 2018 (DE) .................... 10 2018 127 784
Nov. 7, 2018 (JP) ........................... 2018-210110

(51) Int. Cl.
*G11B 19/20* (2006.01)
*G11B 25/04* (2006.01)

(52) U.S. Cl.
CPC ........ *G11B 19/2036* (2013.01); *G11B 25/043* (2013.01); *G11B 2220/2516* (2013.01)

(58) Field of Classification Search
CPC .......................... G11B 19/2036; G11B 25/043
USPC ...................................... 360/99.08
See application file for complete search history.

(56) References Cited

U.S. PATENT DOCUMENTS

| 8,902,549 | B1* | 12/2014 | Komagaki | ........... G11B 5/1278 360/319 |
| 8,958,180 | B1* | 2/2015 | Park | ................. G11B 5/3912 360/319 |
| 2012/0182645 | A1 | 7/2012 | Kurokawa | |
| 2013/0031773 | A1 | 2/2013 | Matsuyama | |
| 2014/0001895 | A1 | 1/2014 | Ryu | |
| 2014/0313872 | A1* | 10/2014 | Rawat | ................. G11B 13/045 369/13.33 |
| 2014/0326699 | A1* | 11/2014 | Hsiao | ................. G11B 5/855 216/22 |

(Continued)

FOREIGN PATENT DOCUMENTS

JP 2016-111907 6/2016

*Primary Examiner* — Allen T Cao
(74) *Attorney, Agent, or Firm* — Cooper & Dunham LLP

(57) ABSTRACT

A spindle motor includes a base plate on which a through hole is formed, a stator assembly provided at an top side of the base plate having a stator core with stator windings, a circuit board provided at the bottom side of the base plate and to which a lead wire of the stator windings drawn from the through hole to the bottom side is connected. An insulating cover sheet is provided at the top side of the base plate for covering the through hole, the insulating cover sheet being passed through by the lead wire, and a sealing material filling the through hole. The insulating cover sheet has a wire hole and an air vent part communicating with the through hole, wherein the air vent part faces at least a portion of an inside opening of the through hole. The wire hole and the air vent part are separated from each other or are connected to form a single opening.

20 Claims, 22 Drawing Sheets

(56) References Cited

U.S. PATENT DOCUMENTS

| | | | |
|---|---|---|---|
| 2014/0377589 A1* | 12/2014 | Freitag | G11B 5/3143 |
| | | | 428/812 |
| 2015/0206550 A1* | 7/2015 | Freitag | G11B 5/11 |
| | | | 216/22 |
| 2016/0293194 A1* | 10/2016 | Contreras | G11B 5/607 |
| 2018/0174610 A1 | 6/2018 | Shimomura | |

* cited by examiner

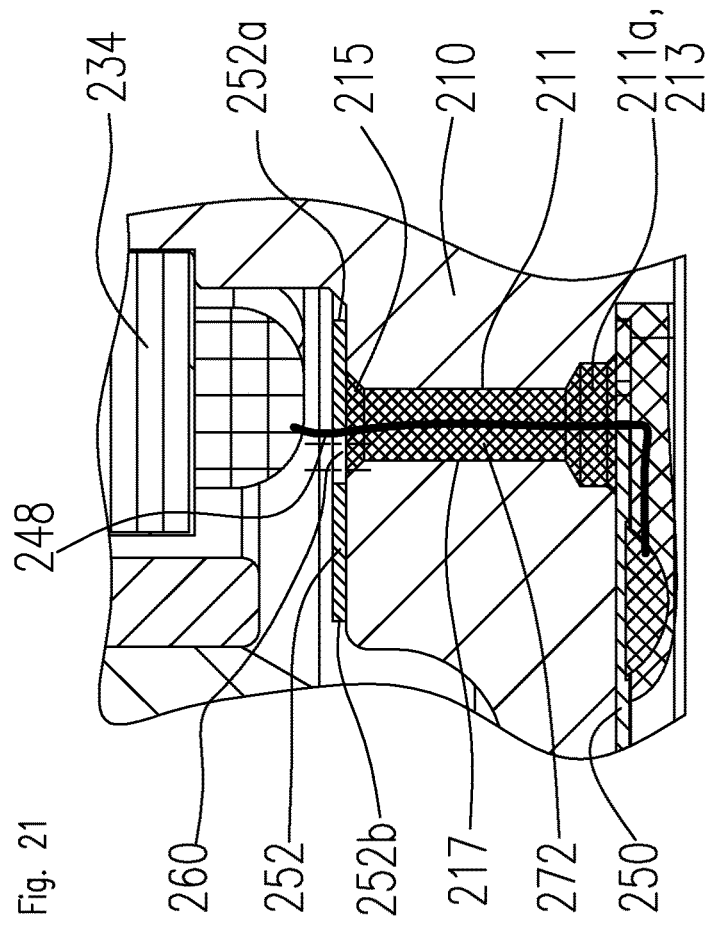
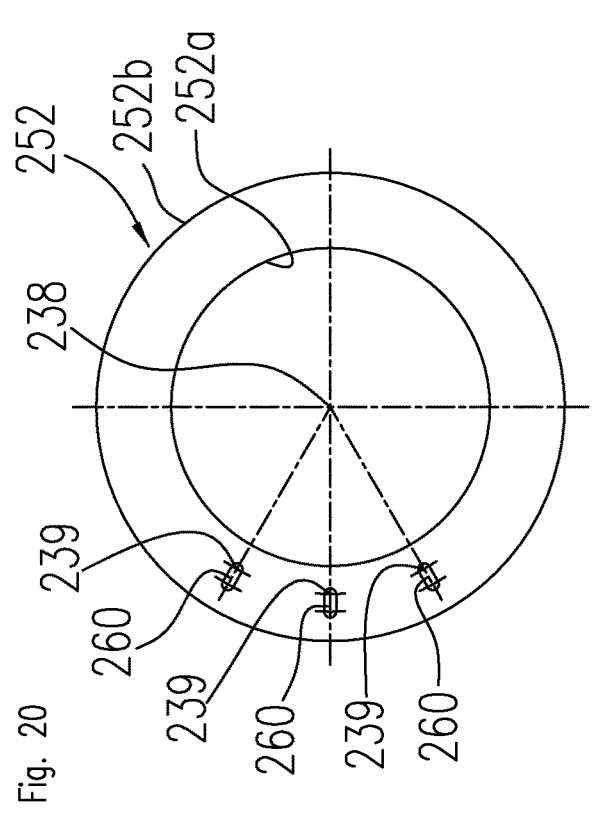
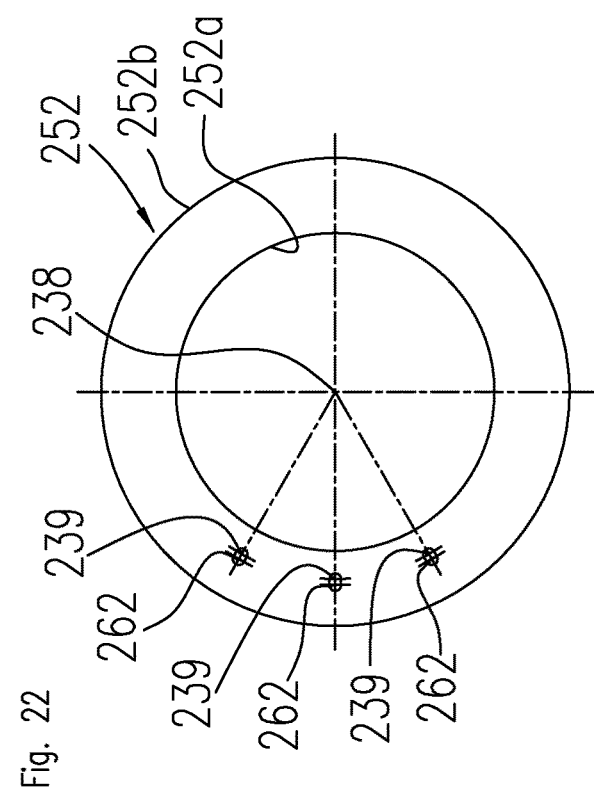

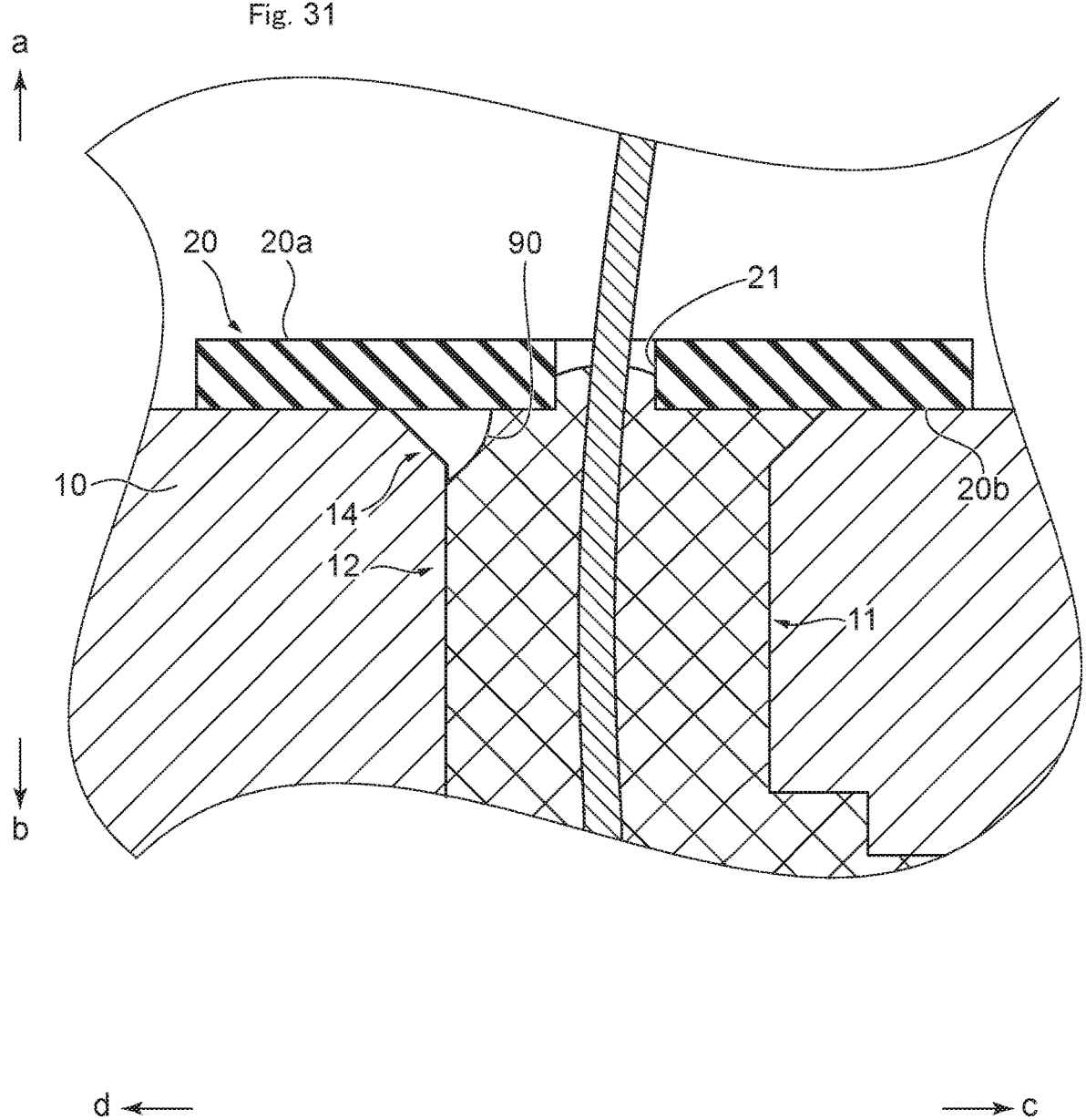

SPINDLE MOTOR

The invention relates to a spindle motor, in particular a spindle motor having a fluid-dynamic bearing system, as it is used, for example, for driving hard disk drives, fans, laser scanners or similar devices.

A spindle motor is an electrical machine having a stationary motor component and a rotatable motor component, which are supported to be rotatable with respect to each other for example by means of a fluid-dynamic bearing system. The stationary motor component is supported on a base plate comprising a top side and a bottom side, wherein a stator assembly comprising a plurality of stator windings is arranged on the top side of the base plate, wherein the stator windings have a plurality of winding wires. The base plate comprises one or more through holes, which communicate the top side of the base plate with its bottom side. An insulating cover sheet, comprising a plurality of openings, is arranged on the top side of the base plate in the area of the through holes. The insulating cover sheet is formed to be electrically insulating. Each winding wire passes through an associated opening of the insulating cover sheet and an associated through hole of the base plate from the top side of the base plate to the bottom side of the base plate, where it is electrically contacted. The through holes are closed in an air-tight manner by means of a molding material which is introduced into the through holes.

The latest generations of hard disk drives are filled with a gas lighter than air, preferably helium, to reduce friction on the rotating parts, hence the molding material for closing off the through holes has to be helium-tight. The insulating cover sheet has openings in the form of holes with a small diameter, which is only slightly larger than the diameter of the winding wire passing through this opening. The insulating cover sheet is preferably adhesively glued to the top side of the base plate. The insulating cover sheet serves to provide electric insulation between the bottom side of the stator assembly and the metallic base plate and also to guide the winding wire through the through hole so that the winding wire does not come into contact with and or create an electric contact with the through hole.

By filling the through holes of the base plate with a molding sealing material, which is preferably done from the bottom side of the base plate, air is trapped between the molding material and the insulating cover sheet. This air can only escape from this cavity with difficulty since the insulating cover sheet is adhesively glued to the base plate and the winding wire passes through the opening in the insulating cover sheet very snugly. The enclosed air can cause the creation of air bubbles or cavities in the molding material either immediately or later, so that the helium tightness of the molding material can no longer be ensured.

Such a hard disk drive device, where sealing material 80 is poured from the outside of the base plate 10 into the through holes 11 to seal the through holes 11 on the base plate 10, as shown in FIG. 31, involves the risk of trapping air and creating air bubbles 90 within the through holes 11 and between the through holes 11 and an insulating cover sheet 20 fixed on a top side 10a of the base plate 10. Then, when the sealing material 80 including air bubbles 90 is cured and the air bubbles 90 are thermally expanded, a crack may occur in the sealing material 80, and gas, such as helium, will leak from this crack to the outside of the hard disk drive device.

This problem was addressed in US 2018/0174610 A1, wherein it is suggested, for example in FIG. 4 to provide a vent 44 in the base plate below the insulating cover sheet 50, so that the air trapped between the molding material 45 and the insulating cover sheet 50 can escape to the outside. In a different approach in accordance with FIG. 5 of this US publication, it is suggested to provide an additional small opening 44 in the insulating cover sheet 50 for venting. The approach in accordance with FIG. 4 of the US document has the drawback, however, that an additional opening 44 has to be created in the base plate, which increases manufacturing overhead. In accordance with FIG. 5, an additional opening 44 is provided in the insulating cover sheet, which also requires an additional manufacturing step, however.

US 2012/0182645 A1 and US 2013/0031773 A1 disclose a spindle motor having a base plate including one or more through holes. A cover plate is attached to a top side of the base plate and comprising a plurality of openings. Each opening of the cover plate is associated with and at least partially covers a through hole of the base plate. Winding wires pass through an associated opening of the cover plate and an associated through hole of the base plate, wherein the cross-sectional area of the opening of the cover plate corresponds to at least double the cross-sectional area of the winding wire passing therethrough.

It is an object of the present invention to further develop a spindle motor of the initially mentioned type in such a way that the insulating cover sheet allows easy guiding of the winding wire, is easy to manufacture and which ensures venting of the air from the sealed through hole.

To achieve this object, the spindle motor according to a preferred embodiment of the present invention includes a base plate on which a through hole is formed, a stator assembly provided at an top side of the base plate having a stator core with stator windings, a circuit board provided at the bottom side of the base plate and to which a lead wire of the stator windings drawn from the through hole to the bottom side is connected, an insulating cover sheet provided at the top side of the base plate for covering the through hole, the insulating cover sheet being passed through by the lead wire, and a sealing material filling the through hole. The insulating cover sheet has a wire hole and an air vent part communicating with the through hole, wherein the air vent part faces at least a portion of an inside opening of the through hole.

In a preferred embodiment of the invention, the wire hole and the air vent part are separated from each other.

In another preferred embodiment, the inside opening of the through hole is a chamfered portion or a counterbore portion.

Advantageously, the through hole is completely filled with the sealing material so that sealing material also exists in the air vent part of the insulating cover sheet. According to a further preferred embodiment of the present invention, the wire hole and the air vent part are connected together and form a joint opening, wherein said opening of the insulating cover sheet is associated with and at least partially covers the through hole of the base plate, wherein the cross-sectional area of the opening of the insulating cover sheet corresponds to at least double the cross-sectional area of the lead wire of the stator winding passing therethrough.

In a preferred embodiment, it is provided that the opening in the insulating cover sheet is formed as circular or oval-shaped opening.

The cross-sectional area of the circular or oval-shaped opening in the insulating cover sheet corresponds to at least double, preferably at least three times, the cross-sectional area of the lead wire passing through the opening.

Preferably, several circular or oval-shaped openings are arranged along a circular line along the insulating cover sheet. The circular line is preferably not centrally arranged between the inner edge of the insulating cover sheet and the outer edge of the insulating cover sheet, but arranged in such a manner that the lead wire is adjacent to the edge of the insulating cover sheet and, at the same time, preferably centrally passes through the through hole in the base plate.

This circular and oval-shaped opening in the insulating cover sheet, which has a substantially larger cross-sectional area than the cross-sectional area of the lead wire passing through it, ensures that the lead wire passing therethrough does not completely close off the opening but leaves a passage through which the enclosed air between the molding material and the insulating cover sheet can vent.

Each lead wire passes through a circular or oval-shaped opening and is thus positioned with respect to the associated through hole of the base plate.

In an advantageous embodiment of the invention, the center axis of each opening of the insulating cover sheet is arranged offset with respect to the center axis of the associated through holes of the base plate. Herein the edge of the circular or oval-shaped opening of the insulating cover sheet is positioned directly above the associated through hole of the base plate, wherein the lead wire is in contact with and guided by this edge of the opening.

Furthermore, it can be advantageously provided that the insulating cover sheet is formed as a circular ring or a ring segment, and has an inner edge and an outer edge, wherein the openings are spaced with respect to each other on a circular arc.

In a further preferred embodiment of the invention, a plurality of radially outwardly extending notches are provided at the inner edge of the insulating cover sheet, and are positioned in such a way that each notch is associated with one through hole of the base plate and comes to lie above the associated through hole.

In another embodiment of the invention it is provided that a plurality of radially inwardly extending slits, recesses or notches are provided on the outer edge of the insulating cover sheet, and are positioned in such a way that each notch is associated with one through hole and comes to lie above the associated through hole.

The formations of the insulating cover sheet comprising the notches have in common that each lead wire is guided by a notch and is positioned with respect to the associated through hole. Herein, the lead wire is preferably at the innermost point of the notch, wherein this innermost point of the notch is approximately aligned with the center point of the through hole. The notches are spaced with respect to each other and are arranged on the inner edge or the outer edge of the insulating cover sheet.

For example, the circular or oval-shaped openings or notches are arranged at an angle of 30° on the circumference with respect to each other. This angle can vary and can differ depending on the design of the spindle motor or the through holes.

The through holes in the base plate are also preferably arranged on a circular arc whose center point is, for example, the axis of rotation of the spindle motor.

The respective notches can be formed as V-shaped, triangular or half-circular notches. They can also be provided in the shape of rectangular notches.

The invention will be described in the following with reference to several exemplary embodiments with reference to the drawings. Further features and advantages of the invention can be derived therefrom.

FIG. 20 shows a plan view of a further embodiment of the insulating cover sheet with oval-shaped openings.

FIG. 21 shows a partial sectional view of the base plate with the insulating cover sheet of FIG. 20.

FIG. 22 shows a modified embodiment of the insulating cover sheet of FIG. 20.

FIG. 31 shows a partially enlarged view of the vicinity of a through hole on the base plate of the spindle motor examined by the inventors.

Figure 1:
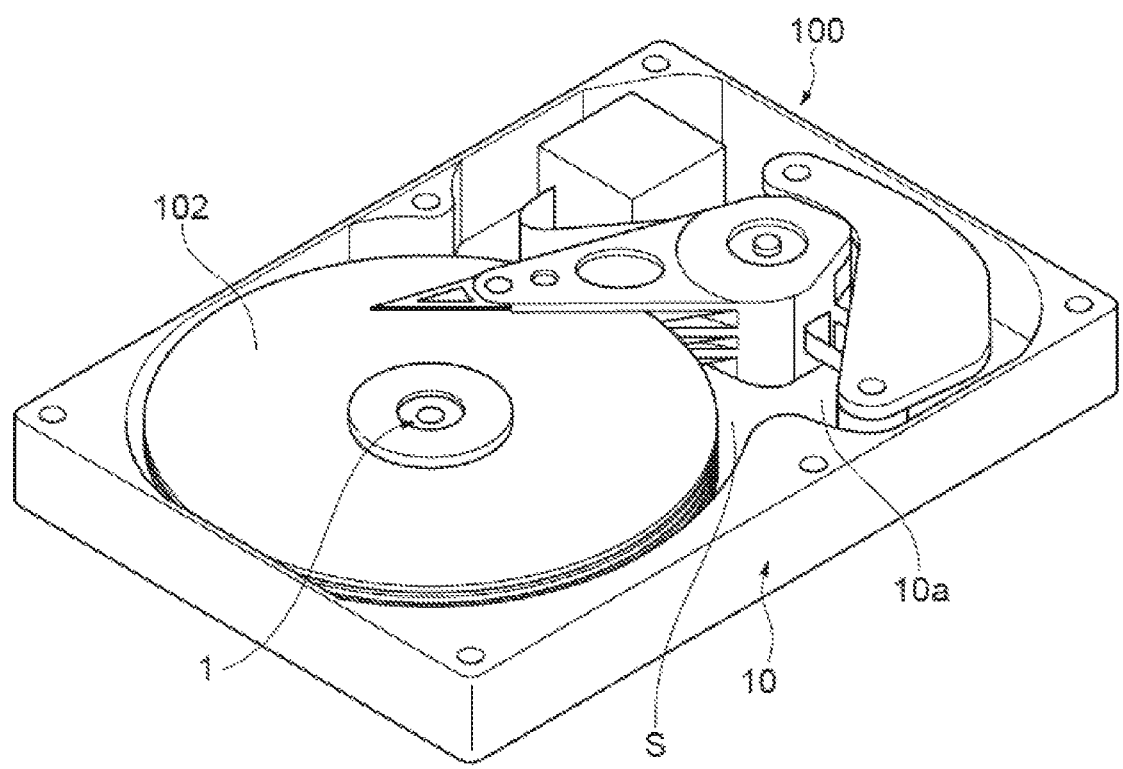
FIG. 1 shows a perspective view of the hard disk drive device according to an embodiment of the present invention.

FIG. 1 is a perspective view of the structure of a hard disk drive device 100, to which a spindle motor 1 according to an embodiment of the present invention is applied. As for the hard disk drive device 100, the spindle motor 1 is fixed on the inner surface and top side 10a of a base plate 10, thereby rotatably supporting the magnetic disks 102. A casing for the hard disk drive device 100 is formed by a cover (not shown) and the base plate 10. Gas whose density is lower than air (such as helium, nitrogen or helium-nitrogen mixed gas) is filled in the internal space S formed by the cover and the base plate 10.

Figure 2:
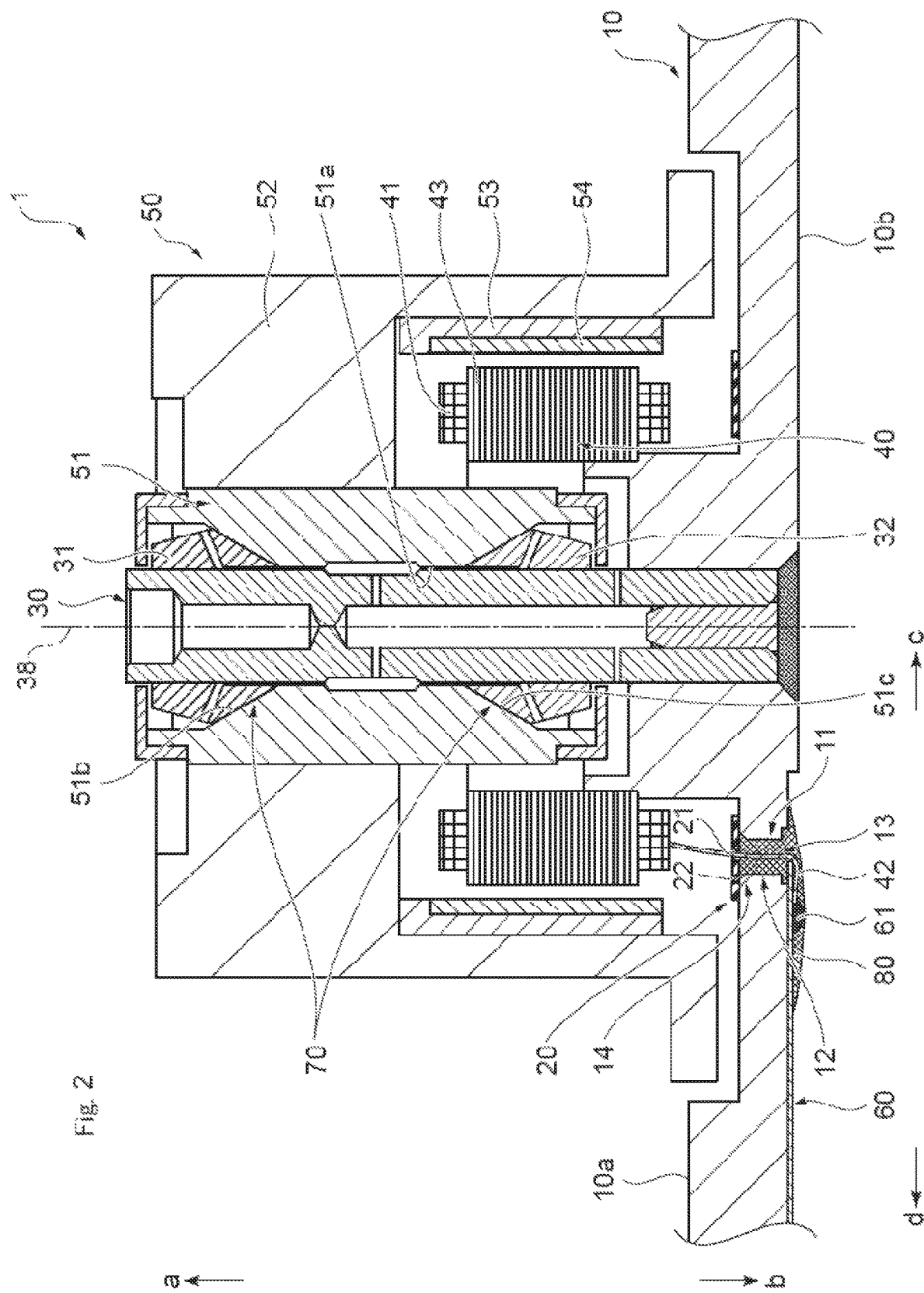
FIG. 2 shows a cross-sectional view of the main part of the spindle motor of the hard disk drive device shown in FIG. 1.

FIG. 2 is a cross-sectional view of the structure of the spindle motor 1 shown in FIG. 1. Hereinafter, one side (the direction shown by arrow a) in the direction of the axis 38 of the spindle motor in FIG. 2 (hereinafter also referred to as the axis 38 direction) will be defined as the upper side, and the other side (the direction shown by arrow b) will be defined as the lower side. Further, the one side which approaches the axis 38 in the radial direction that is orthogonal to the axis 38 (the direction shown by arrow c) will be defined as the radially inside direction, and the other side which departs from the axis 38 (the direction shown by arrow d) will be defined as the radially outside direction.

The spindle motor 1 according to an embodiment of the present invention includes the base plate 10 on which through holes 11 are formed, and a stator assembly having a stator core 40 provided at the inside of the base plate 10, and on which stator windings 41 are wound. Further, the spindle motor 1 includes a FPC board 60 as a circuit board provided at the outside of the base plate 10, and to which lead wires 42 of the stator windings 41, drawn from the through holes 11 to the outside, are connected.

The spindle motor 1 includes an insulating cover sheet 20 covering the through holes 11, which is provided at the inside of the base plate 10, and through which the lead wires 42 pass. Furthermore, the spindle motor 1 includes a sealing material 80 filling the through holes 11. The insulating cover sheet 20 has wire holes 21 and air vent holes 22 as air vent parts, communicating with the through holes 11. The through holes 11 have an inside opening 14 which opens toward the inside of the base plate 10, an outside opening 13 which opens toward the outside of the base plate 10, and a cylindrical straight hole portion 12 provided between the inside opening 14 and the outside opening 13. The air vent holes 22 faces at least a portion of the inside opening 14.

The spindle motor 1 has, as shown in FIG. 2, a base plate 10, a shaft 30 and a stator core 40 fixed to the base plate 10, and a rotor 50 which is rotatable around the shaft 30. The base plate 10 is formed, for example, from aluminum alloy, and has an inside inner surface (top side 10a) to which the stator core 40 is fixed and an outside outer surface (bottom side 10b) at the opposite side of the inner surface 10a when viewed in the axis 38 direction.

Further, the base plate 10 has through holes 11 passing between the inner surface 10a and the outer surface 10b. Details about these through holes 11 will be described later. The base plate 10 defines the internal space S (FIG. 1) of a hard disk drive device 100.

An upper conical bearing member 31 and a lower conical bearing member 32 are fixed to the shaft 30 separated apart from each other in the axis 38 directions, both of the conical bearing members 31 and 32 having a conical outer surface. The rotor 50 has a sleeve 51 having a shaft insertion hole 51a into which the shaft 30 is inserted, a hub 52 fixed to the outer peripheral surface of the sleeve 51, and a yoke 53 and a ring magnet 54 fixed to the hub 52. The ring magnet 54 is a permanent magnet which is magnetized such that the polarity is reversed in circumferential direction. The yoke 53 suppresses leakage of magnetic flux from the ring magnet 54.

The shaft insertion hole 51a of the sleeve 51 has an upper conical inner surface 51b at its upper (direction shown by arrow a) and a lower conical inner surface 51c at its lower (direction shown by arrow b) end. The upper conical inner surface 51b and the upper conical bearing member 31 are opposing each other via a bearing gap filled with lubricant oil. Further, dynamic pressure generating grooves are formed at least on the upper conical inner surface 51b or the opposing conical outer surface of the upper conical bearing member 31. Thus, a fluid dynamic bearing part 70 is formed. In the same manner, the lower conical inner surface 51c and the lower conical bearing member 32 are opposing each other via a bearing gap filled with lubricant oil. Dynamic pressure generating grooves are formed at least on the lower conical inner surface 51c or the opposing conical outer surface of the lower conical bearing member 32. Thus, a fluid dynamic bearing part 70 is formed.

With this configuration, during the rotation, the rotor 50 is supported at the inner surface 10a side of the base plate 10 by the fluid dynamic bearing part 70. Furthermore, the stator core 40 wound with the coils 41 is fixed to the inner surface 10a of the base plate 10, such that the stator core 40 opposes the ring magnet 54.

The stator core 40 has a structure in which annularly processed electromagnetic steel plates are laminated. The stator core 40 is located at the radially outer side (direction shown by arrow d) of the fluid dynamic bearing part 70, and a plurality of pole tooth 43 are provided apart from each other in circumferential direction. Each of the pole teeth 43 has a stator winding 41 wound thereon. Lead wires 42 are drawn from the stator windings 41. The lead wires 42 pass through the through holes 11 of the base plate 10 and are connected by soldering with solder 61 to the FPC board 60 bonded to the outer surface 10b of the base plate 10. Thus, a control current from the output of the FPC board 60 is supplied to the stator windings 41 via the lead wires 42.

By supplying current to the stator windings 41 and switching the polarity, the magnetic attraction and the magnetic repulsion generated between the ring magnet 54 and the pole teeth 43 of the stator core 40 are switched, and the rotor 50 rotates around the shaft 30 fixed to the base plate 10. The high-speed rotation of the rotor 50 generates a dynamic pressure on the fluid dynamic bearing part 70, and the rotor 50 rotates without contacting the shaft 30, the upper conical bearing member 31 and the lower conical bearing member 32.

The spindle motor 1 includes an insulating cover sheet 20 covering the through holes 11 which is provided at the inside of the base plate 10. Wire holes 21 and air vent holes 22 both communicating with the through holes 11 are formed on the insulating cover sheet 20. The air vent hole 22 faces a portion of the inside opening 14 of the through hole 11. On the insulating cover sheet 20 shown in FIG. 3, the wire holes 21 and the air vent holes 22 are formed separately.

Figure 3:
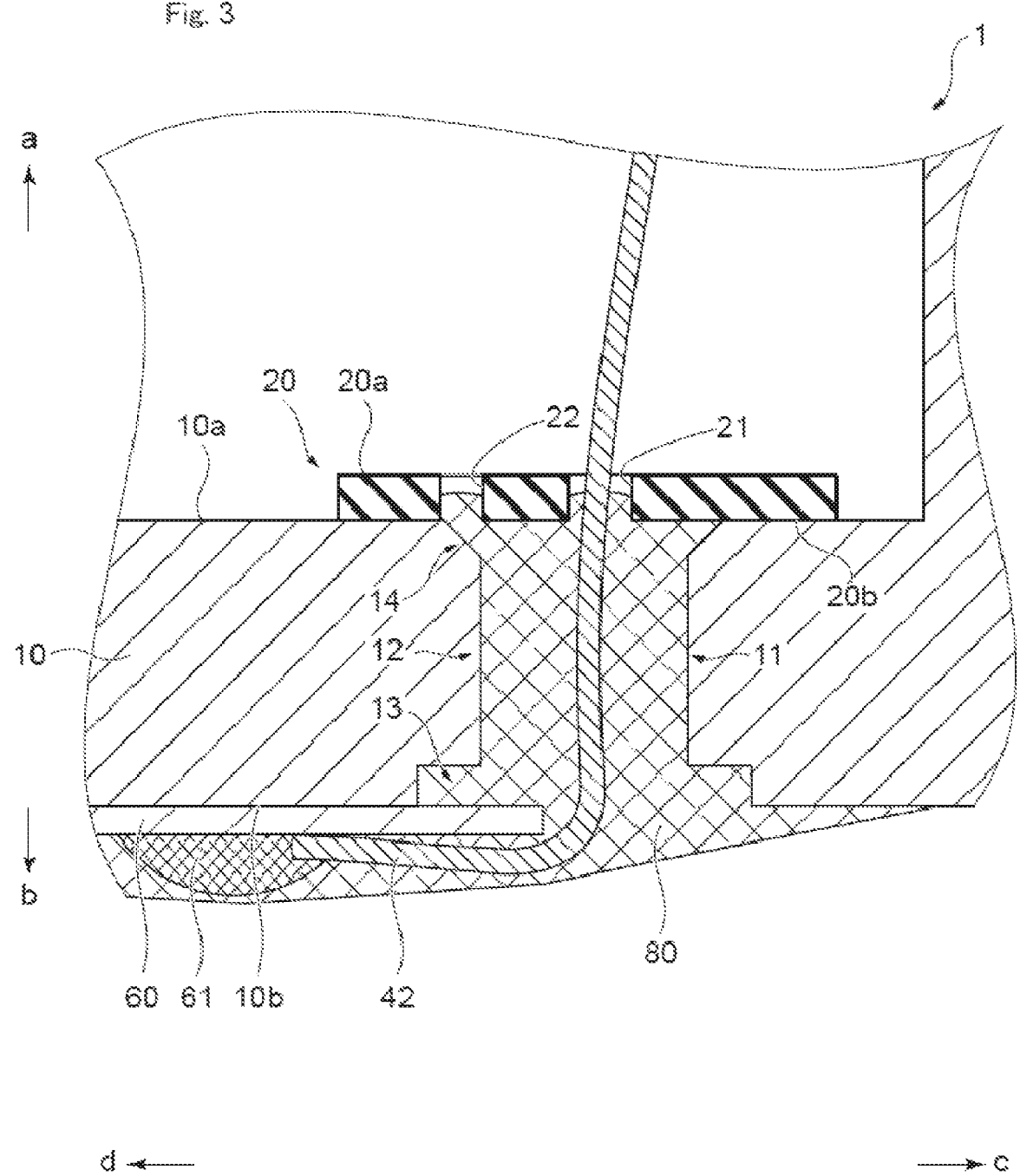
FIG. 3 shows a partially enlarged cross-sectional view of the vicinity of a through hole on the base plate of the spindle motor shown in FIG. 2.
Figure 4:
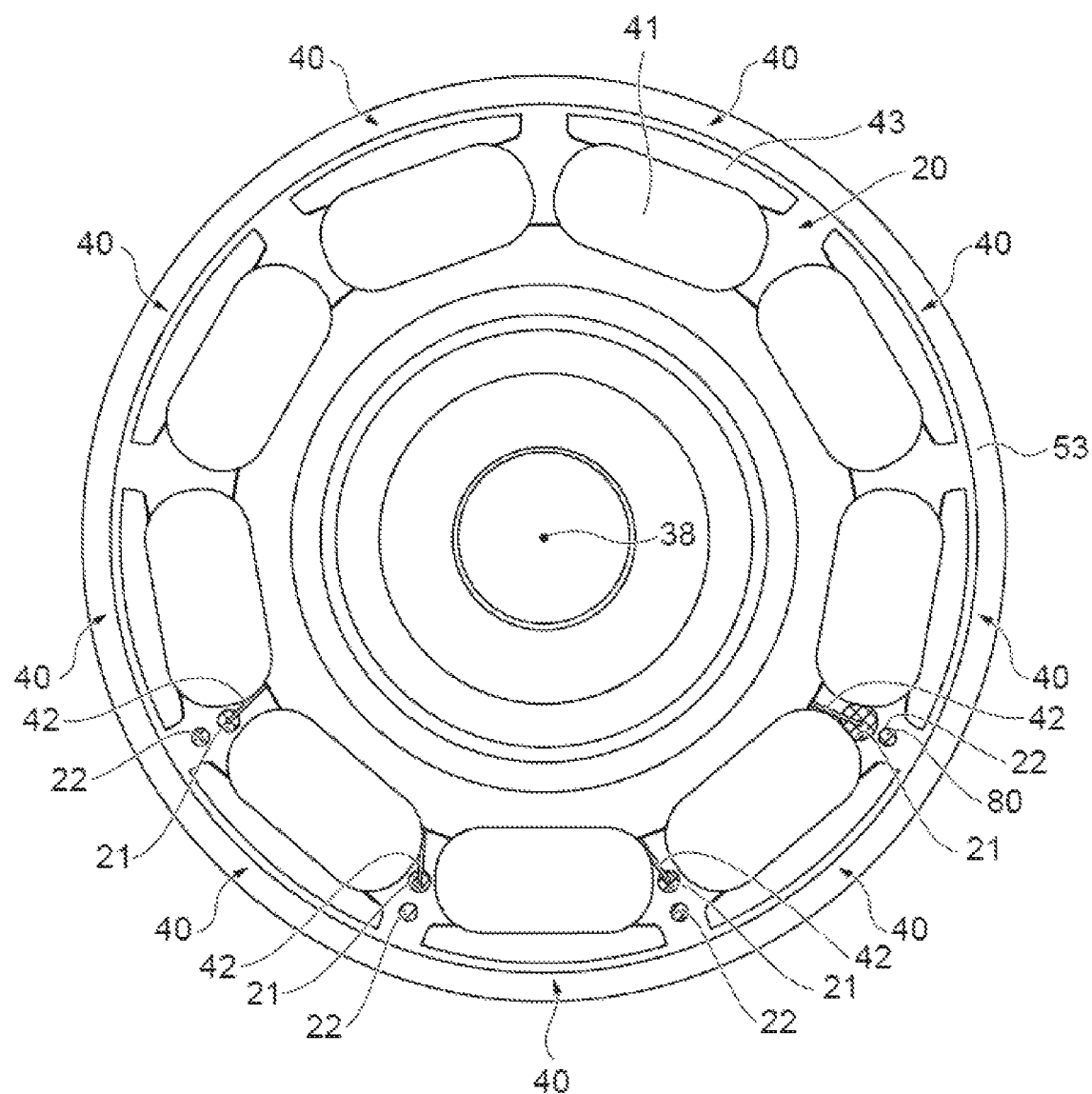
FIG. 4 shows a partially enlarged view of the stator core, the insulating cover sheet and the base plate of the spindle motor shown in FIG. 2, viewed from the inside.

As shown in FIG. 3 and FIG. 4, a plurality of (for example four) through holes 11 are formed on the base plate 10 passing through the base plate 10 between the inner surface 10a and the outer surface 10b. Each of the through holes 11 has a straight hole portion 12 extending parallel to the axis 38 direction in a cylindrical shape, an outside opening 13 which is open at the lower side of the through holes 11 (at the outside of the base plate 10), and an inside opening 14 which is open at the upper side of the through holes 11 (at the inside of the base plate 10).

The outside opening 13 of the through hole 11 on the base plate 10 is a counterbore portion coaxial with the straight hole portion 12 of the through hole 11. Concretely, the outside opening 13 extends in cylindrical shape and is in communication with the lower side of the straight hole portion 12 of the through hole 11. The diameter of the outside opening 13 is made lager than the straight hole portion 12 of the through hole 11. The outside opening 13 may be a chamfered portion coaxial with the straight hole portion 12 of the through hole 11.

The inside opening 14 of the through hole 11 on the base plate 10 is a chamfered portion (a C-chamfered or R-chamfered portion) which is coaxial with the straight hole portion 12 of the through holes 11, and has a diameter larger than the diameter of the straight hole portion 12 of the through holes 11. The inside opening 14 is in communication with the upper side of the straight hole portion 12. The inside opening 14 is also coaxial with the outside opening 13 of the through hole 11, and defines a tapered surface whose diameter increases from the upper end of the straight hole portion 12 toward the upper side. Alternatively, the inside opening 14 may be a counterbore portion coaxial with the straight hole portion 12.

Figure 5:
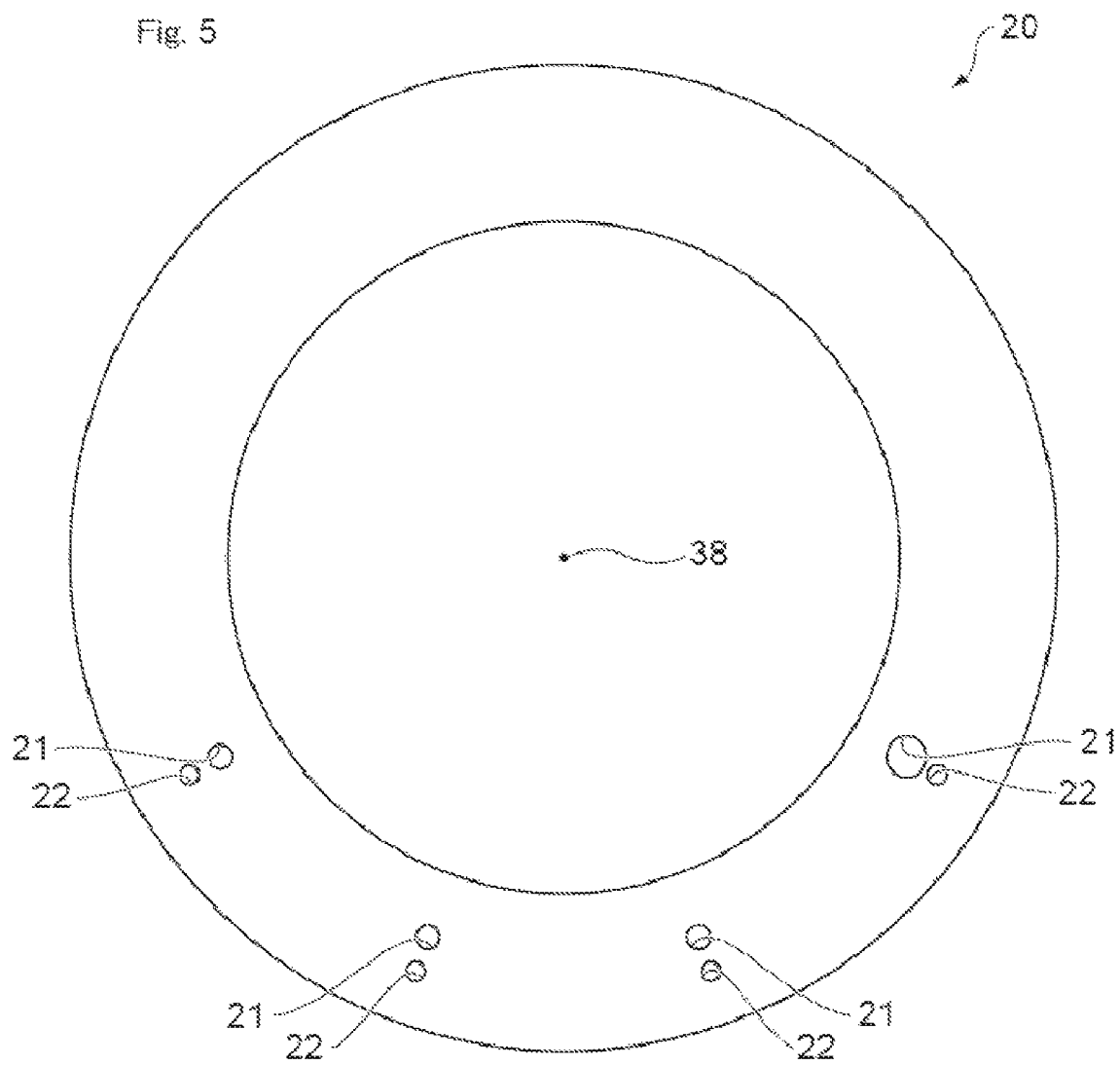
FIG. 5 shows the insulating cover sheet shown in FIG. 4.

The insulating cover sheet 20 is fixed by being bonded with an adhesive agent to the inner surface 10a of the base plate 10. The insulating cover sheet 20 is an insulator film of for example polyimide, annularly formed around the axis 38 (FIG. 5). The radial width of the insulating cover sheet 20 is larger than the diameter of the inside opening 14 of the base plate 10. A plurality (for example four) of wire holes 21 are formed on the insulating cover sheet 20, passing through the insulating cover sheet 20 between the upper surface 20a which is the upper side surface of the insulating cover sheet 20 and the lower surface 20b which is the lower side surface of the insulating cover sheet 20.

The plurality of wire holes 21 are respectively formed at the position corresponding to the plurality of through holes 11 on the base plate 10. In other words, the insulating cover sheet 20 is fixed to the inner surface 10a of the base plate 10 via an adhesive agent, aligned such that the wire holes 21 face the through holes 11. The plurality of wire holes 21 are formed on the central part of the width of the insulating cover sheet 20 separated from each other at predetermined interval in circumferential direction.

The wire holes 21 are coaxial with the inside openings 14 of the base plate 10, and the diameter of the wire holes 21 is smaller than the diameter of the inside openings 14 and the diameter of the straight hole portion 12 of the base plate 10.

Further, on the insulating cover sheet 20 are formed a plurality (for example four) of air vent holes 22, which define through holes, passing through the insulating cover sheet 20 between the upper surface 20a and the lower surface 20b of the insulating cover sheet 20. The plurality of air vent holes 22 are respectively formed more radially outward than the center of the through holes 11.

As shown in FIG. 4 and FIG. 5, the plurality of air vent holes 22 are respectively formed to be aligned at the radially outer side (the direction shown by arrow d) of the plurality of wire holes 21, separated from each other at predetermined intervals in circumferential direction. In this case, the later described sealing material 80 is supposed to be poured in from a radially inner side of the outside opening 13 shown in FIG. 3, with the outer surface 10b of the base plate 10 facing upward. Thus, the sealing material 80 poured into the through holes 11 fills the internal space by flowing from the outside opening 13 toward the inside opening 14 and from the radially inner side to the radially outer side. In this situation, since the air vent holes 22 are arranged facing the inside openings 14 and at a radially opposite side of the position through which the sealing material 80 is poured, air can be discharged smoothly from the air vent holes 22, allowing the sealing material 80 to fill the internal space of the through hole 11 completely. As shown in FIG. 5, the diameter of the air vent holes 22 is equal or smaller than the diameter of wire holes 21.

As shown in FIG. 3, the air vent holes 22 are formed partially overlapping the chamfered portions which are the inside openings 14, when viewed in the axis 38 direction. This means that the air vent holes 22 are formed such that they face a portion of the circumference of the inside opening 14 which is the connecting part between the inner surface 10a and the upper end portion of the inside opening 14.

As shown in FIG. 3, at the outer surface 10b of the base plate 10, the FPC board 60 covers a portion of the outside opening 13 of the through holes 11 from the radially outer side. The FPC board 60 covers the outside opening 13 from the outer circumferential side up to the center (or near the center) of the straight hole portion 12.

The FPC board 60 has a wiring pattern formed by a copper foil on a substrate which is a thin insulator made by, for example, polyimide. On the surface (lower side) of the FPC board 60 are formed terminals which correspond to the exposed parts of the wiring pattern.

The FPC board 60 is fixed to the outer surface 10b of the base plate 10 with an adhesive agent, after positioning the end surface of the radially inner side (the direction shown by arrow c) of the FPC board 60 in the vicinity of the radial center of each straight hole portion 12 of the plurality of the through holes 11. The lead wires 42 drawn from the stator windings 41 of the stator core 40 are electrically connected to the terminals of the FPC board 60 via the corresponding through holes 11, by soldering with solder 61.

The through holes 11 are completely sealed with the sealing material 80, i.e., the through holes 11 are filled with the sealing material 80 without leaving any gap. Thus, the sealing function becomes superior compared to a sealing where the through holes 11 are sealed with the sealing material 80 up to only halfway of the holes. Further, the sealing material 80 which fills completely the through holes 11 seals also the wire holes 21 and the air vent holes 22. The sealing material 80 may be, for example, a thermosetting resin which is cured after filling the inside openings 14, the straight hole portions 12 and the outside openings 13 of the base plate 10, as shown in FIG. 3.

Further, the sealing material 80 is filled up to the internal space of the wire holes 21 and the air vent holes 22. Because the sealing material 80 also exists in the wire holes 21 and the air vent holes 22, it is easy to confirm that the through holes 11 are completely filled with the sealing material 80. Further, the sealing material 80 fills the through holes 11 so that the lead wires 42 are positioned in the vicinity of the centers of the inside openings 14, the straight hole portions 12 and the outside openings 13. Thus, the lead wires 42 are prevented from contacting the base plate 10.

Further, the sealing material 80 covers a portion of the outer surface 10b of the base plate 10 which includes the through holes 11. Furthermore, the sealing material 80 is cured while covering the lead wires 42 as well as the solder 61 on the FPC board 60 and a portion of the FPC board 60 including the wiring pattern.

The air vent holes 22 are formed facing a portion of the inside opening 14 of the through holes 11. Specifically, each air vent hole 22 is formed at a position where a portion of the air vent hole 22 overlaps the chamfered portions defining the inside openings 14, in the axis 38 direction, as shown in FIG. 3.

Figure 13:
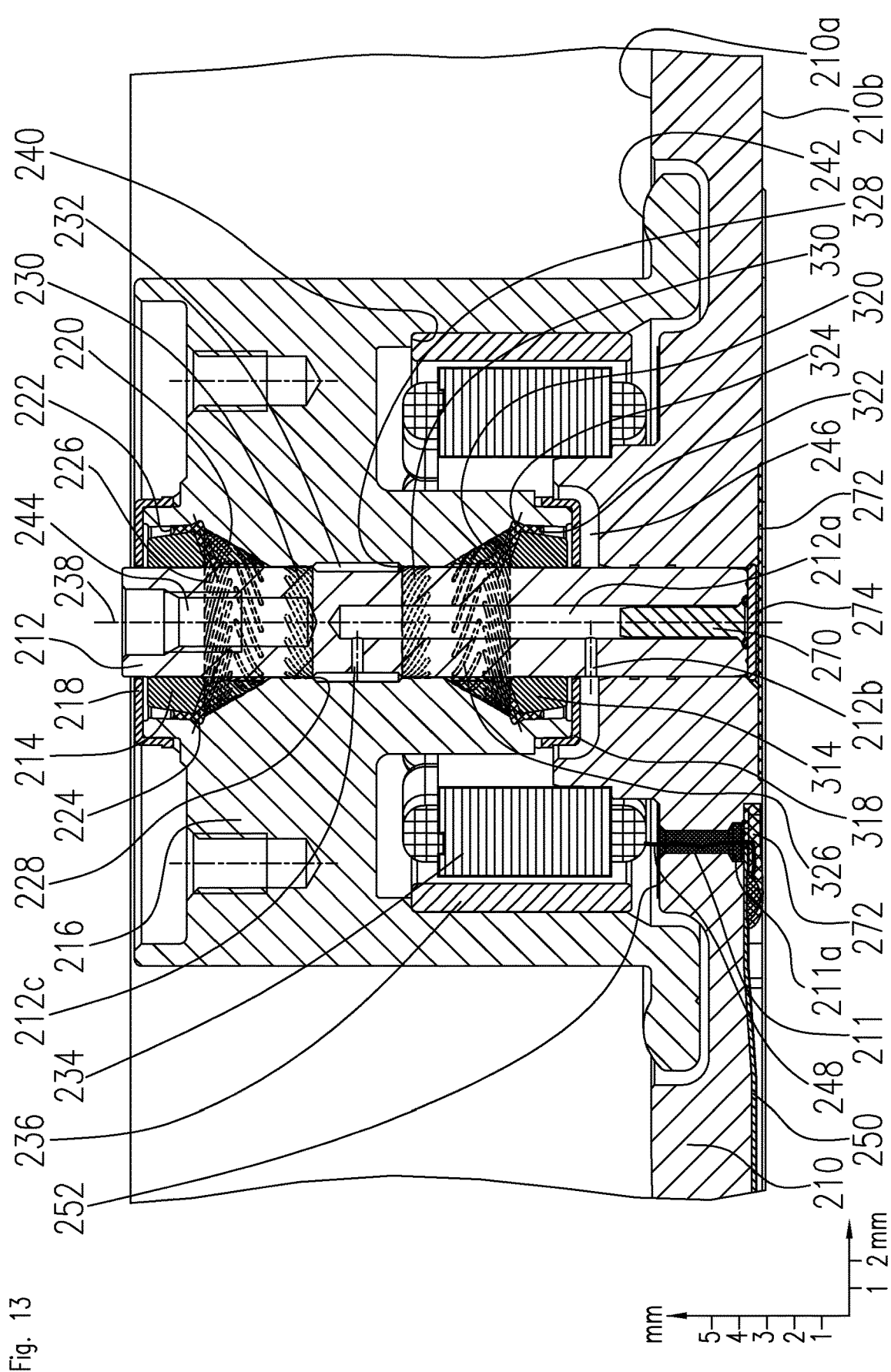
FIG. 13 shows a section of a further exemplary embodiment of a spindle motor according to the invention having two conical fluid-dynamic bearings.

Here, if the air vent holes 22 are not formed on the insulating cover sheet 20, as shown in FIG. 31, the air bubbles 90 may remain between the insulating cover sheet 20 and the inside opening 14. When the sealing material 80 is poured into the through holes 11 from the outside (outside opening 13) of the base plate 10, in a state that the base plate 10 shown in FIG. 13 is turned upside down, there is a possibility of air bubbles 90 being generated between the insulating cover sheet 20 and a portion of the circumference of the inside openings 14. However, because the air vent holes 22 in the present embodiment face at least a portion of the circumference of the inside openings 14, air is effectively discharged from the air vent holes 22 when the sealing material 80 is poured into the through holes 11. Therefore, the generation of air bubbles 90 can be suppressed. In contrast, if the air vent holes 22 do not face the inside openings 14, like for example overlapping only with the straight hole portion 12 in the axis 38 direction, the generation of air bubbles 90 cannot be suppressed effectively because the air bubbles near the circumference of the inside openings 14 cannot escape easily to the outside.

Thus, the spindle motor 1 according to an embodiment of the present invention can prevent the leakage of gas such as helium from the cracks on the sealing material 80 caused by the thermal expansion of air bubbles. This means that, the spindle motor 1 according to an embodiment of the present invention can improve the sealing performance of the through holes 11 of the base plate 10.

Further, the spindle motor 1 according to an embodiment of the present invention has the plurality of air vent holes 22 respectively formed at a position in the axis 38 direction different from the position in the outside openings 13 through which the sealing material 80 is poured into the through holes 11. More specifically, the air vent holes 22 are formed at a position which is radially opposite to the position in the outside openings 13 through which the sealing material 80 is poured into the through holes 11. Therefore, the formation of air bubbles in the location between the insulating cover sheet 20 and the inside openings 14, where air bubbles are easily generated can be restrained.

Further, in the spindle motor 1 according to an embodiment of the present invention, the diameter of the air vent holes 22 is equal or smaller than the diameter of wire holes 21. Therefore it is possible to seal the through holes 11 by supplying the sealing material 80 up to about halfway of the air vent holes 22 in axis 38 direction, and the leakage of the sealing material 80 into the inside of the spindle motor 1 can be prevented.

While the present invention has been described with reference to an embodiment, it should be understood that the invention is not limited to the embodiment described above, but includes any mode within the concept of the present invention and the scope of the claims, where any appropriate modification is possible.

For example, as shown in FIG. 6 to FIG. 11, the air vent parts may adopt different shapes and configurations as long as they are formed facing at least a portion of the inside opening 14 of the through holes 11.

Figure 6:
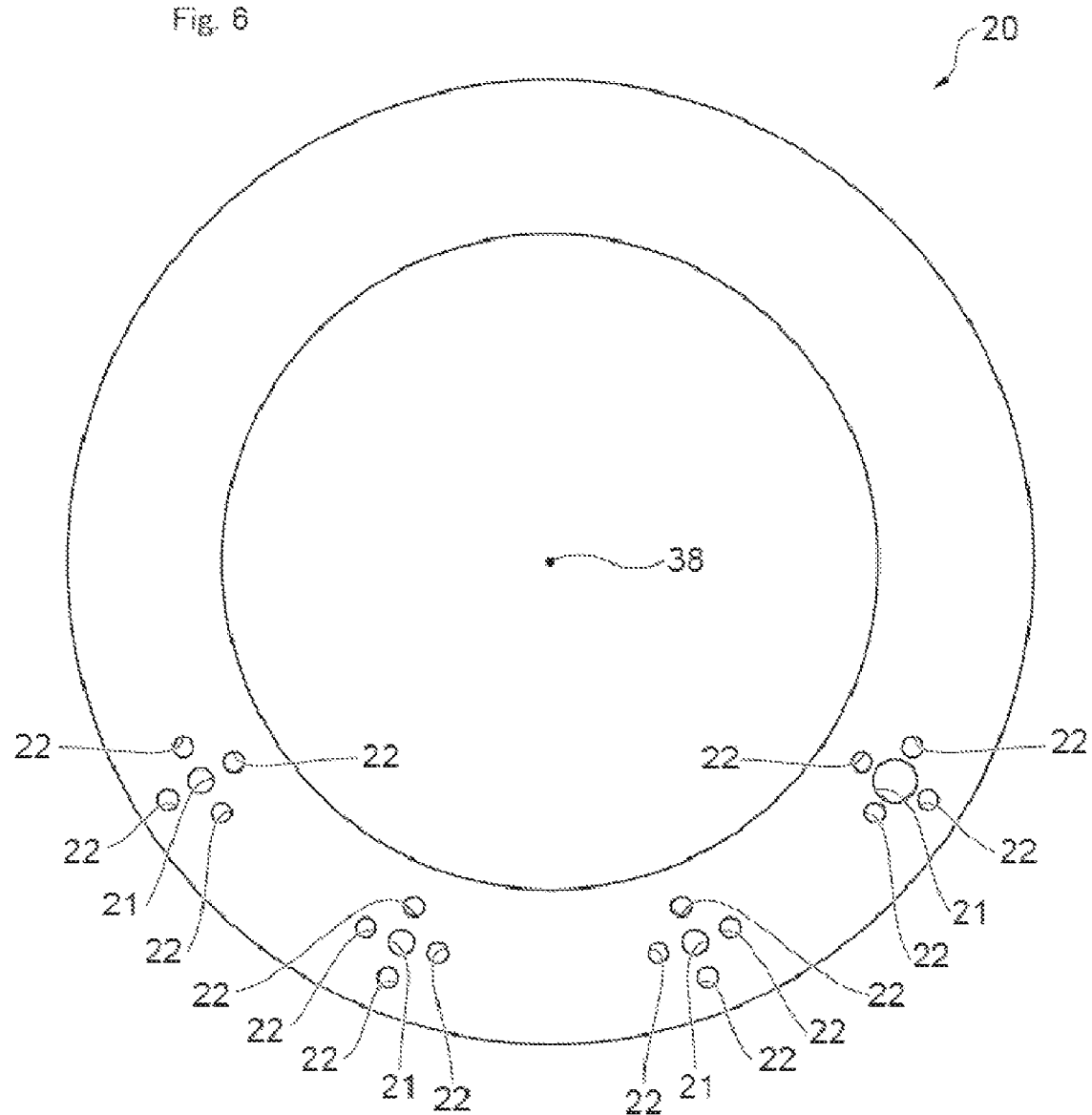
FIG. 6 shows a variation of the insulating cover sheet according to an embodiment of the present invention.

As shown in FIG. 6, a plurality (for example four) of air vent holes 22 serving as air vent parts may be formed for each of the wire holes 21 (that is for each of the through holes 11) on the insulating cover sheet 20 in the spindle motor 1. In this case, the four air vent holes 22 may be formed such that, for each wire hole 21, one air vent hole 22 is formed at the radially inner side, one at the radially outer side, and one on each of both sides in the circumferential direction of the insulating cover sheet 20. Because of the plurality of air vent holes 22 formed around one wire hole 21, air can be discharged more easily.

Figure 7:
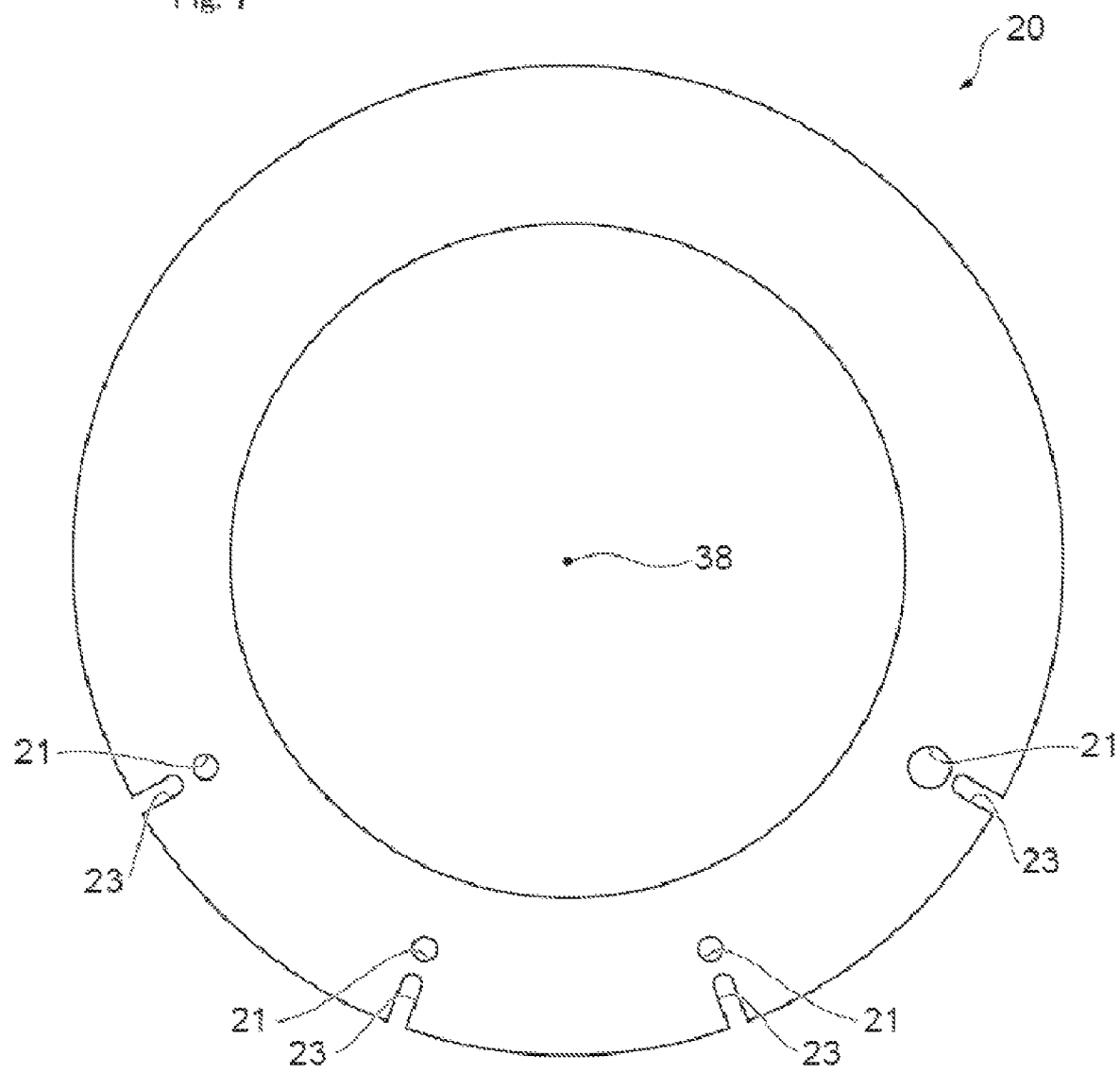
FIG. 7 shows a variation of the insulating cover sheet according to an embodiment of the present invention.

Further, as shown in FIG. 7, a plurality (for example four) of cutouts 23 serving as air vent parts may be formed separated from the wire holes 21 in the insulating cover sheet 20 of spindle motor 1. In this case, the cutouts 23 are respectively formed at the radially outer side of the plurality of wire holes 21. The cutouts 23 extend radially from the outer circumference of the insulating cover sheet 20 toward its inner circumference, without reaching the wire holes 21.

Figure 8:
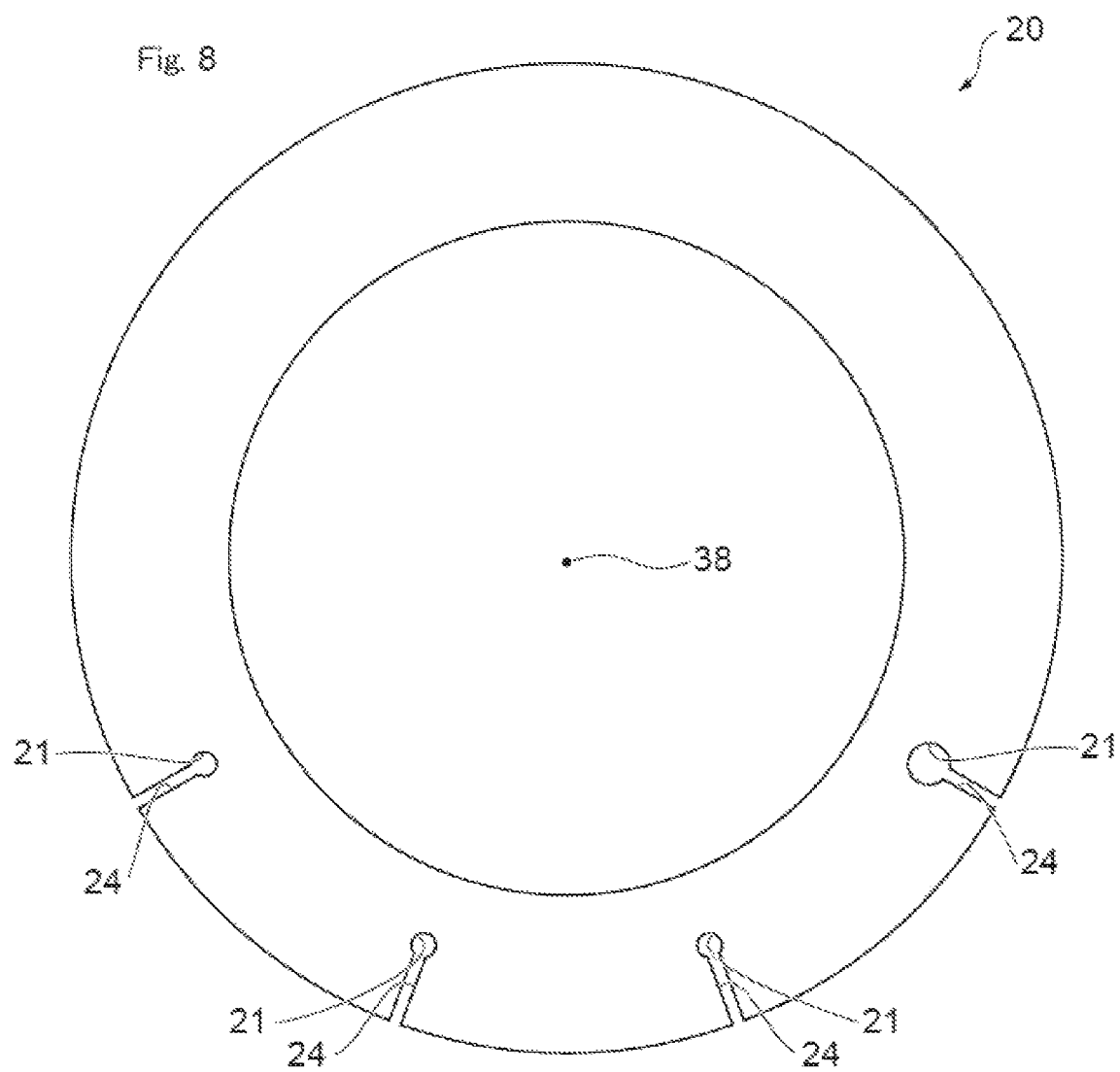
FIG. 8 shows a variation of the insulating cover sheet according to an embodiment of the present invention.

Further, as shown in FIG. 8, a plurality (for example four) of slits 24 serving as air vent parts may be formed in the insulating cover sheet 20 of spindle motor 1. In this case, the slits 24 are respectively formed at the radially outer side of the plurality of wire holes 21. The slits 24 extend radially from the outer circumference of the insulating cover sheet 20 toward its inner circumference and are connected to the wire holes 21 from the radially outer side.

Figure 9:
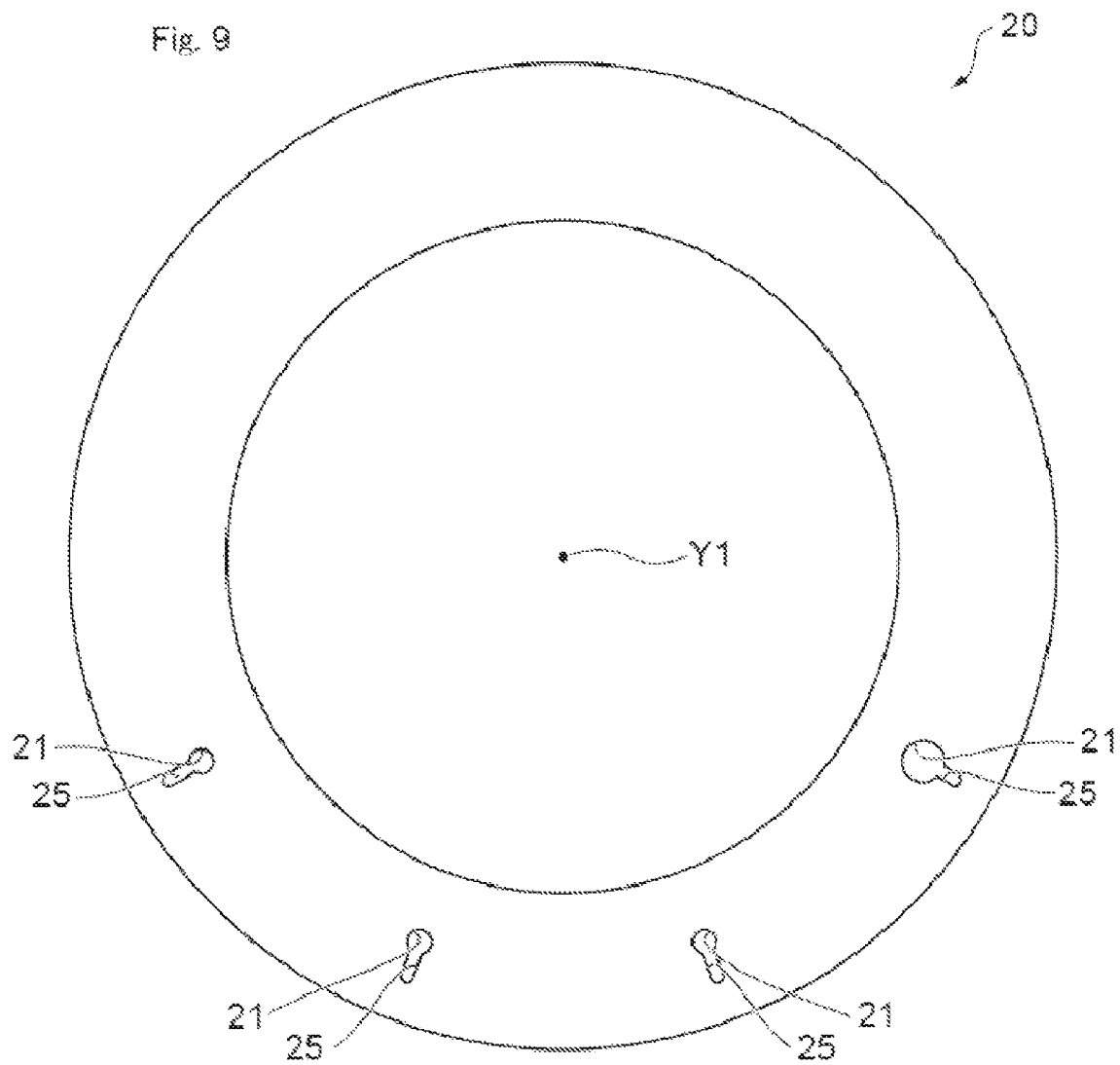
FIG. 9 shows a variation of the insulating cover sheet according to an embodiment of the present invention.

Further, as shown in FIG. 9, a plurality (for example four) of slits 25 serving as air vent parts may be formed in the insulating cover sheet 20 of spindle motor 1. The slits 25 are different from the slits 24 and extend radially outward from the wire holes 21 without reaching the outer circumference of the insulating cover sheet 20, i.e., each of the slits 25 is formed connected to the respective wire hole 21 to define one radially elongated hole.

Figure 10:
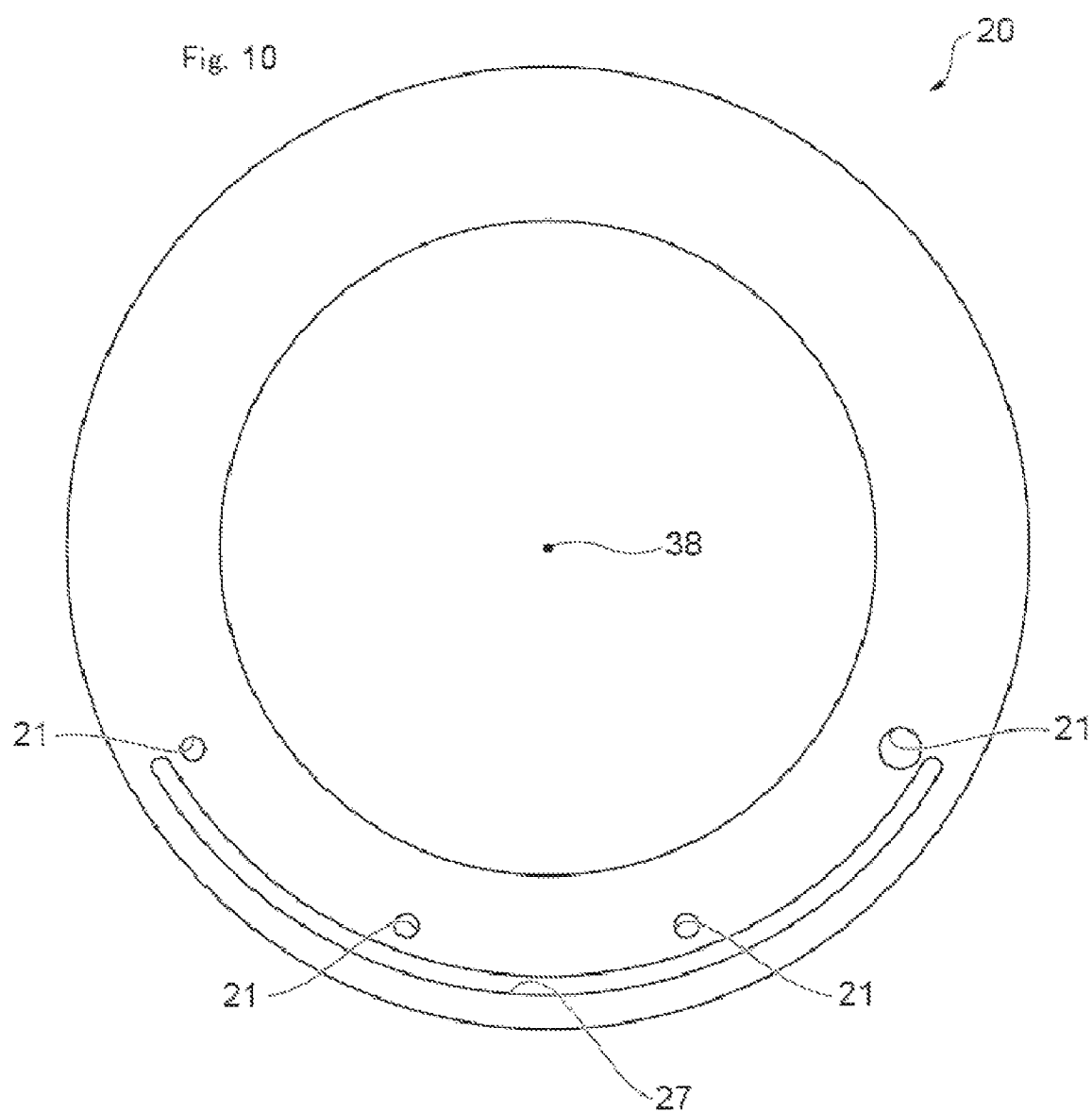
FIG. 10 shows a variation of the insulating cover sheet according to an embodiment of the present invention.

Further, as shown in FIG. 10, an arc-shaped elongated hole 27 serving as an air vent part may be formed in the insulating cover sheet 20 of spindle motor 1. In this case, the elongated hole 27 is formed between the plurality of wire holes 21 and the outer circumference of the insulating cover sheet 20, and extends in the circumferential direction of the insulating cover sheet 20. The arc-shaped elongated hole 27 may be formed as a plurality of separated elongated holes arranged in circumferential direction.

Figure 11:
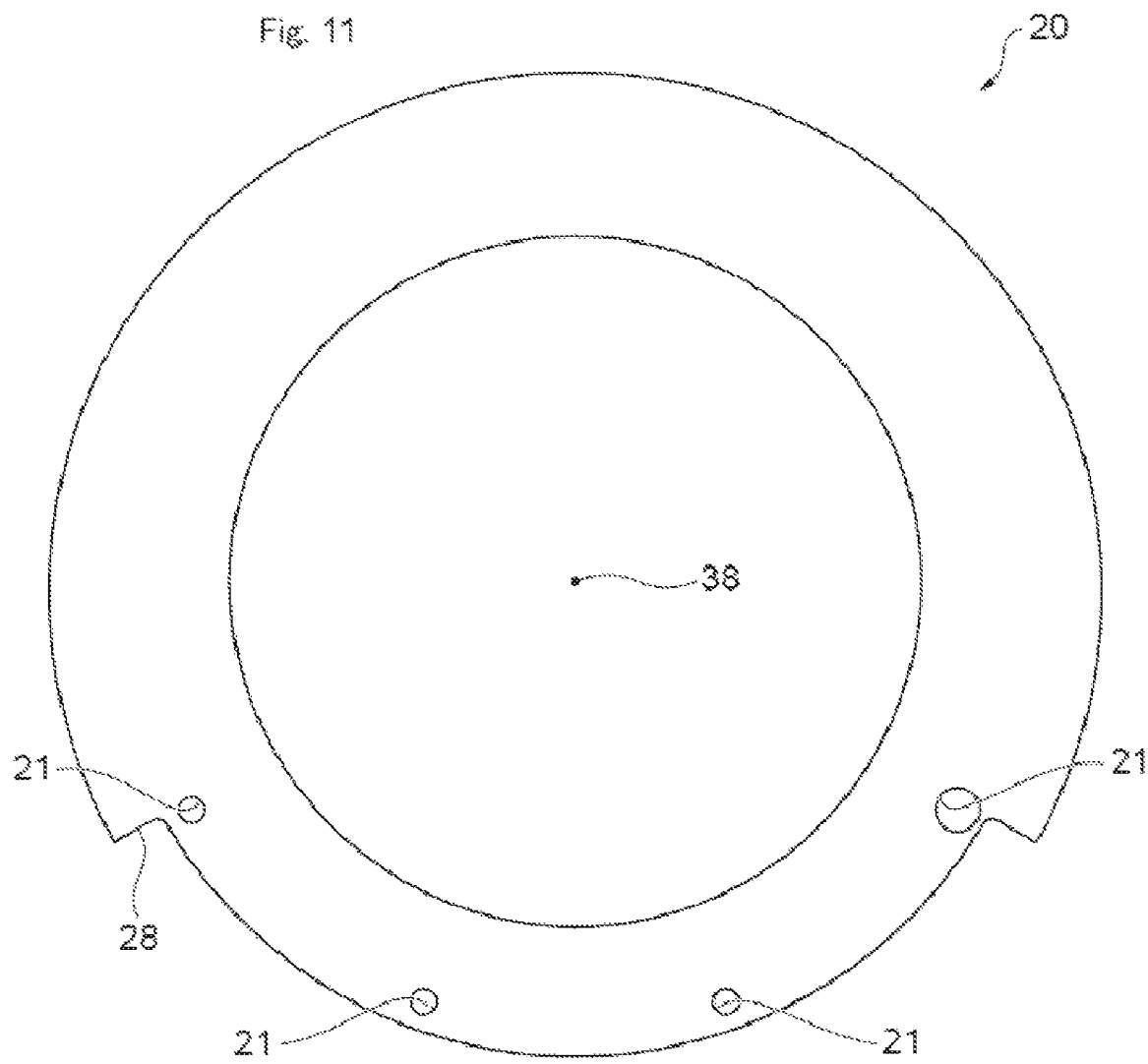
FIG. 11 shows a variation of the insulating cover sheet according to an embodiment of the present invention.

Further, as shown in FIG. 11, an arc-shaped cutout 28 serving as an air vent part may be formed in the insulating cover sheet 20 of spindle motor 1. In this case, the cutout 28 is formed at the radially outer side of the plurality of wire holes 21 and extends, in the circumferential direction of the insulating cover sheet 20.

Figure 12:
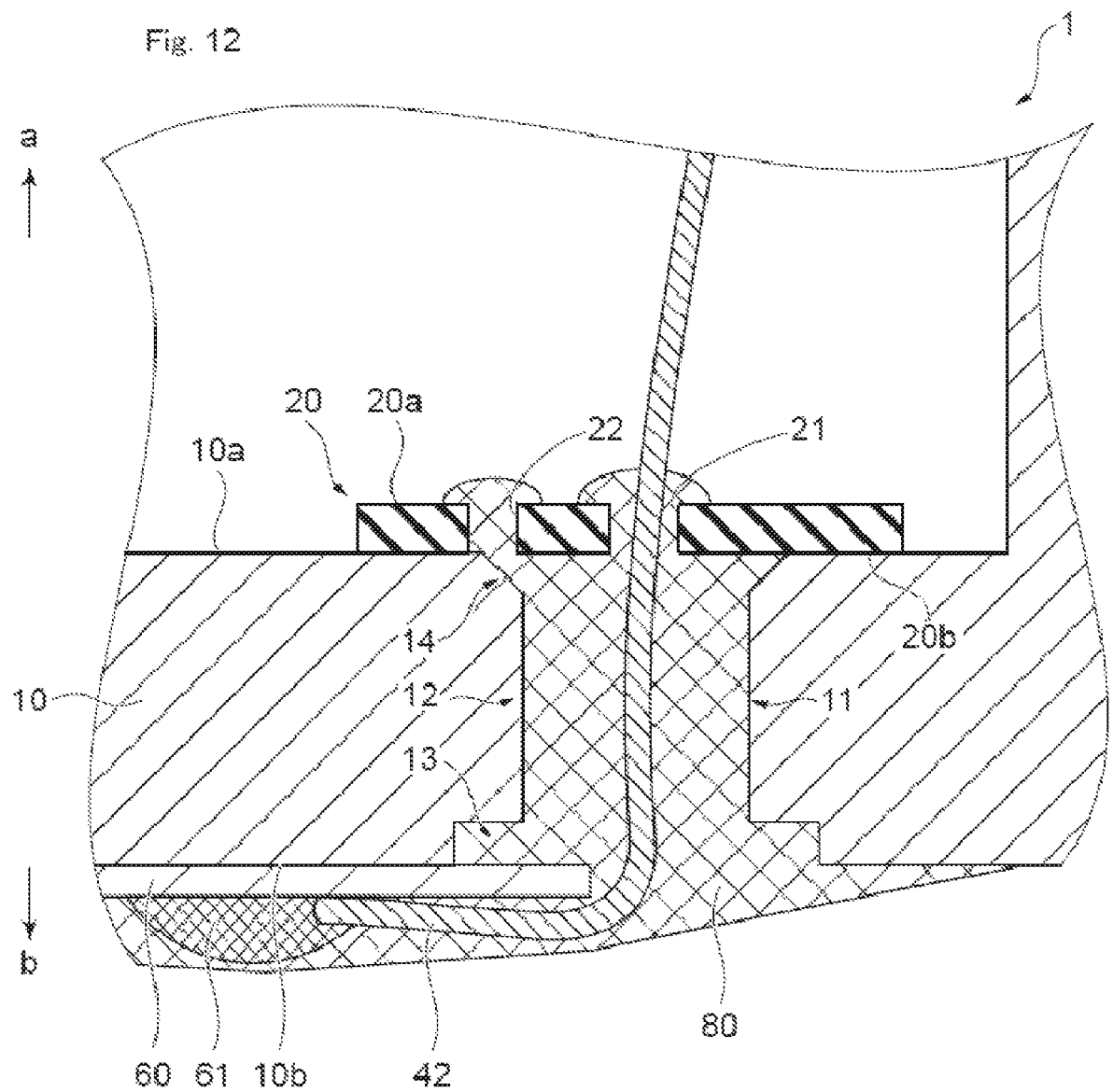
FIG. 12 shows a partially enlarged view showing a variation of the vicinity of a through hole on the base plate of the spindle motor according to an embodiment of the present invention.

Further, in the spindle motor 1 according to an embodiment of the present invention, the sealing material 80 may be provided such that the internal space of the wire hole 21 and the air vent hole 22 are completely filled, as shown for example in FIG. 12. Then, the sealing material 80 may further be cured covering a part of the upper surface 20a of the insulating cover sheet 20 including the wire holes 21 and the air vent holes 22. By this way, it can be visually confirmed more easily that the sealing material 80 is filling the through holes 11 completely without leaving any gap. Thus, the spindle motor 1 can maintain the air tightness of the internal space S of the hard disk drive device 100 more efficiently than a configuration where only the through hole 11 is sealed with the sealing material 80. Consequently, the sealing performance of the through holes 11 is further improved.

The spindle motor of FIG. 13 according to another embodiment of invention can preferably be used for driving a hard disk drive with a plurality of storage disks.

The spindle motor comprises a base plate 210 with a hole in which a shaft 212 is received. The shaft 212 is preferably fixed in the base plate 210 by means of a joining connection.

For this purpose, a press fit or a transition fit with the addition of adhesive can be used. The bearing system is formed as a conical fluid-dynamic bearing system comprising two oppositely acting conical bearings.

Two bearing cones 214, 314 are arranged on the shaft 212 at an axial distance to each other. The top free end of the shaft 212 comprises a threaded hole 244 and can be connected, by means of a screw inserted in the threaded hole 244, with a stationary component (not shown) which can be, for example, a housing component of the hard disk drive. The base plate 210, the shaft 212 and the two bearing cones 214, 314 form the stationary component of the fluid-dynamic bearing system. Together with an electric stator assembly 234, they form the stationary motor component of the spindle motor.

Each of the bearing cones 214, 314 has an annular bearing surface that is formed at an oblique angle to the rotary axis 238. A rotor component 216 is arranged to be rotatable about the rotary axis 238 relative to the bearing cones 214, 314. The rotor component 216 comprises an inner portion formed as a bearing bushing, which includes bearing surfaces that are annular and arranged obliquely to the rotary axis 238 and respectively opposed to the bearing surfaces of the bearing cones 214, 314.

During the assembly of the bearing, the bottom bearing cone 314 is mounted, for example, on the shaft 212, for example pressed onto the shaft 212, then the rotor component 216 is set on the shaft 212 and finally the upper bearing cone 214 is mounted at a fixed axial distance to the bottom bearing cone 314 on the shaft 212. The assembly thus results in the mutually opposing bearing surfaces of the bearing cones 214, 314 and the rotor component 216 each being separated by an annular bearing gap 220, 320 of a predefined width. The bearing gaps 220, 320 have a width of a few micrometers and are filled with a bearing fluid, for example bearing oil.

The bearing gaps 220, 320 of the two conical bearings are not linked with each other, but each have a top and bottom open end which communicates with the external environment of the bearing. Each of the externally positioned ends of the bearing gaps 220, 320 open out in the direction of the bottom or top ends of the shaft 212, while the internally positioned ends of the bearing gaps 220, 320 open out within the bearing into an annular free space 232 which is arranged between the outer circumference of the shaft 212 and an inner circumference of the rotor component 216. The free space 232 is formed, for example, by a groove or channel provided on the outer circumference of the shaft 212 and/or on the inner circumference of the rotor component 216.

The respective ends of the bearing gaps 220, 320 are sealed off by seals, preferably capillary seals in the form of sealing gaps 222, 322 and 228, 328. The sealing gaps 222, 322 and 228, 328 are partially filled with bearing fluid. The respective outer sealing gaps 222, 322 are preferably formed as conical capillary seals and form a fluid reservoir for the bearing fluid which compensates the thermal expansion of the bearing fluid and serves as a storage volume for the bearing fluid. Moreover, pump seals 230, 330 are preferably arranged along the two inner sealing gaps 228, 328. The pump seals 230, 330 comprise groove structures arranged on the surface of the shaft 212 and/or the opposite surface of the rotor component 216. The groove structures have a pumping effect on the bearing fluid present in the sealing gaps 228, 328 in the direction of the respective bearing gap 220, 320. The outer sealing gaps 222, 322 are respectively limited by a radially outer sealing surface of the bearing cones 214, 314 as well as by an opposite inner sealing surface of a cover 218, 318. The covers 218, 318 are fixed to the rotor component 216.

The bearing surfaces of the bearing cones 214, 314 and/or the bearing surfaces of the rotor component 216 comprise bearing groove structures 226, 326 which have a pumping effect on the bearing fluid present in the respective bearing gaps 220, 320 during the rotation of the rotor component 216 relative to the bearing cones 214, 314. This results in a fluid-dynamic pressure within each bearing gap 220, 320, which enables the bearing to fulfill its supporting function. Both conical bearings have bearing groove structures 226, 326 that are, for example, fishbone-shaped, having, on the one hand, a longer branch that is arranged adjacent to the sealing gap 222, 322 and, on the other hand, a shorter branch that is arranged adjacent to a pump seal 230, 330. The stronger pumping action of the longer branches of the respective bearing grooves 226, 326 of the conical bearing results in a pumping action that is directed into the interior of the bearing overall. Due to the conical design of the bearing cones 214, 314 the conical bearings act as radial and axial bearings at the same time. The two conical fluid-dynamic bearings act against each other in that they pump the bearing fluid in the direction of the respectively associated pump seals 230, 330, so that the pressure in the bearing system is balanced overall.

To ensure good circulation of the bearing fluid in the bearing gaps 220, 320, so-called recirculation channels 224, 324 are provided in the bearing cones 214, 314. By means of the bearing groove structures 226, 326, the bearing fluid present in the bearing gaps 220, 320 is conveyed, starting from the first sealing gap 222, 322 towards the internally positioned second sealing gaps 228, 328 and the pump seals 230, 330. The pump seals 230, 330 pump the bearing fluid back into the interior of the bearing and, via the recirculation channels 224, 324, back to the first sealing gap 222, 322. The recirculation channels 224, 324 first extend between the outer circumference of the shaft 212 and the inner circumference of the bearing cones 214, 314 and then radially outwardly through the bearing cones 214, 314 up to the transition area between the bearing gap 220, 320 and the top sealing gap 222, 322.

In the bearing system shown, having two separate conical bearings and respective bearing gaps 220, 320 with two open ends, it is necessary for the openings of the sealing gaps 228, 328 opening out into the interior of the bearing to be at ambient pressure so that the bearing fluid present in the sealing gaps 228, 328 is also at ambient pressure. A pressure compensation of the interior of the bearing is achieved via the motor space, in which the stator is arranged. The motor space is at ambient pressure and communicates with a transverse hole 212b in the shaft 212 via a free space 246 below the cover 318. The transverse hole opens out into an axial hole 212a in the shaft 212 which communicates with the free space 232 in the interior of the bearing via another transverse hole 212c. The free space 232 and the outer ends of the sealing gaps 228, 328 are thus at the same ambient pressure as for example the outer side of the bearing in the area of the sealing gap 222. The outer sealing gap 322 of the bottom conical bearing is held at ambient pressure via the free space 246.

The rotor component 216 is driven to rotate with respect to the stationary motor components by an electromagnetic drive system. The spindle motor is an electronically commutated DC motor having a drive system comprising an annular stator assembly 234, comprising a plurality of stator windings that is fixed on the base plate 210. The stator assembly 234 is arranged within a recess of the rotor component 216 and is directly opposed to a rotor magnet 236. The rotor magnet 236 is arranged at an inner circumferential surface of the rotor component 216 and separated from the stator assembly 234 by an air gap. By supplying suitable current to the stator windings of the stator assembly 234, an electromagnetic AC field is generated which acts on the rotor magnet 236 and rotates the rotor component 216. According to the present invention, a separate component constituting a magnetic yoke for the rotor magnet 236 can be dispensed with, since the rotor component 216 is preferably of steel and itself is the magnetic yoke. The outer circumferential surface of the rotor magnet 236 is directly adjacent to an inner circumferential surface of the rotor component 216.

A step is preferably arranged on the inner circumference of the rotor component 216, which forms a stop surface 240 for the end face of the rotor magnet 236 and partially covers the end face of the rotor magnet 236. This stop surface 240 facilitates the axial positioning of the rotor magnet 236 and the entry of the magnetic field lines into the rotor component 216 acting as a magnetic yoke.

The stator windings of the stator assembly 234 comprise a plurality of lead wires 248 exiting on the bottom side of the winding packet of the stator assembly 234. The lead wires 248 pass through one or more through holes 211 of the base plate top side 210a to the bottom side 210b of the base plate 210. There, the lead wires 248 are contacted with an electric printed circuit board 250, for example, on respective solder surfaces.

On the outer circumference of the rotor component 216, a support surface 242 is provided which serves as a support for one or preferably a plurality of magnetic storage disks of the hard disk drive.

Depending on the number of phases of the stator windings and the connection of the lead wires 248 the stator assembly 234 can have, for example, three to six lead wires 248. In the exemplary embodiment shown, three lead wires 248 are provided, wherein the stator assembly comprises three phases which are wired, for example, in a triangular or star-shaped circuit.

The through holes 211 in the base plate 210 are formed to be essentially cylindrical. The through holes 211 preferably do not have a uniform diameter but open out at the ends, for example, in the form of a chamfer or a countersink 211a. To facilitate the process of inserting the lead wires 248, the through hole 211 is shaped, at the top side 210a of the base plate 210, preferably with a chamfer. The countersink 211a of the through hole 211 is preferably formed at the bottom side 210b of the base plate 210, where the larger diameter of the countersink 211a of the through hole 211 eases the process of introducing the molding material 272.

An insulating cover sheet 252, which is of an electrically insulating material, is arranged at the top side 210a of the base plate 210 directly beneath the stator assembly 234. The insulating cover sheet 252 comprises a number of openings which correspond to the number of through holes 211 of the base plate 210. The openings of the insulating cover sheet 252 are arranged in such a manner that they come to lie above the through holes 211 of the base plate 210. The lead wires 248 of the stator assembly 234 individually pass through the openings of the insulating cover sheet 252 and continue through the associated through holes 211 of the base plate 210, wherein they are preferably centered in the openings of the insulating cover sheet 252 with respect to the through holes 211 of the base plate 210. This holds the lead wires 248 at a distance to the side wall of the through holes 211 and avoids physical contact between the lead wires 248 and the side walls of the through holes 211 of the metallic base plate 210. The lead wires 248 are preferably provided with an insulating protective lacquer, which can, however, be damaged during the assembly process so that an electric contact cannot be excluded.

After electrically contacting the lead wires 248 on the printed circuit board 250, at least the area of the solder surfaces of the printed circuit board and the through hole 211 is molded over by an electrically insulating molding or sealing material 272. By having the diameter of the through holes 211 open out at the bottom side 210b of the base plate 210, thus on the side of the printed circuit board 250, the insulating sealing material 272 can penetrate the through holes 211 to a large extent and ensures a gas-tight closure of the through holes 211.

The electrically insulating sealing material 272 can be, for example, a 1-component epoxy resin, such as Ajinomoto PLENSET AE-403 or AE-771. This epoxy resin ensures rapid curing with little gas emission. The epoxy resin is halogen free and has a high glass transition temperature while having good heat resistance.

As already described above, the shaft 212 is supported in an opening of the base plate 210. Herein, the shaft 212 is inserted and/or adhesively glued into the opening of the base plate 210.

This join between the shaft 212 and the base plate 210 must also be sealed so that there is no gas exchange between the interior of the motor housing and the ambient environment. The longitudinal hole 212a of the shaft 212 and the bottom end face of the shaft 212 is closed off, for example, by means of a stopper 270. The shaft 212 and the stopper 270 are preferably of steel and are welded one to the other. Then the free space at the end face of the shaft 212 closed off with the stopper 270 is closed off by means of a sealing material 272, such as Ajinomoto PLENSET AE-403 or AE-771, which comes to lie on the end face of the shaft 212 and the adjacent side walls of the base plate in a sealing manner. Furthermore, a sealing disc 274 can also be placed on the molded areas and adhesively glued to the base plate 210. This ensures a gas-tight closure of the connection area between the shaft 212 and the base plate 210.

Figure 14:
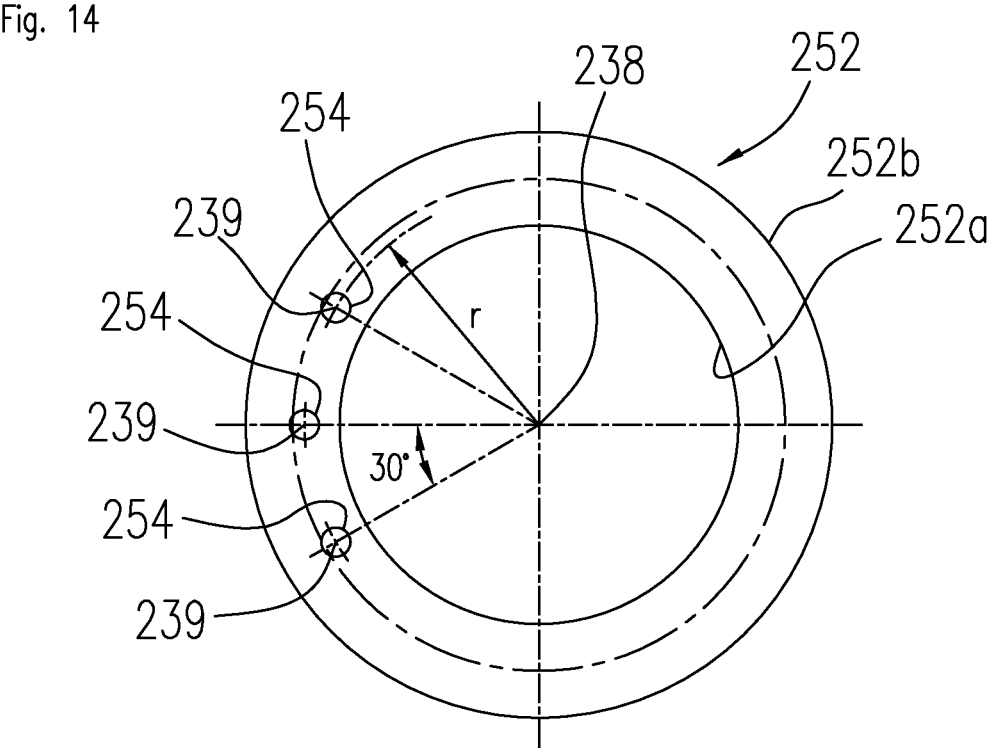
FIG. 14 shows a plan view of a first embodiment of the insulating cover sheet with openings.

FIG. 14 shows a first embodiment of the insulating cover sheet 252. The insulating cover sheet 252 is formed to be circular ring-shaped and comprises an inner edge 252a and an outer edge 252b.

The insulating cover sheet 252 is preferably of a plastic material, in particular a thin plastic film, carrying on the one side preferably an adhesive coating so that the insulating cover sheet 252 can be adhesively glued to the surface of the base plate 210.

The insulating cover sheet 252 is formed to be, for example, circular and is arranged directly beneath the stator assembly 234 on the top side of the base plate 210.

The insulating cover sheet 252 comprises a series of openings 254 arranged on a circular line having the radius r, mutually spaced from each other.

The circular line having the radius r is preferably non-central between the inner edge 252a and the outer edge 252b of the insulating cover sheet 252, but is, for example, closer to the inner edge 252a.

Preferably, there are three holes 254 for guiding three lead wires 248.

There are also three through holes 211 in the base plate 210 which are associated with the openings 254 of the insulating cover sheet 252 and respectively receive one lead wire 248.

It can also be provided that a single elongate through hole 211 is in the base plate 210 for commonly passing all lead wires 248.

Figure 15:
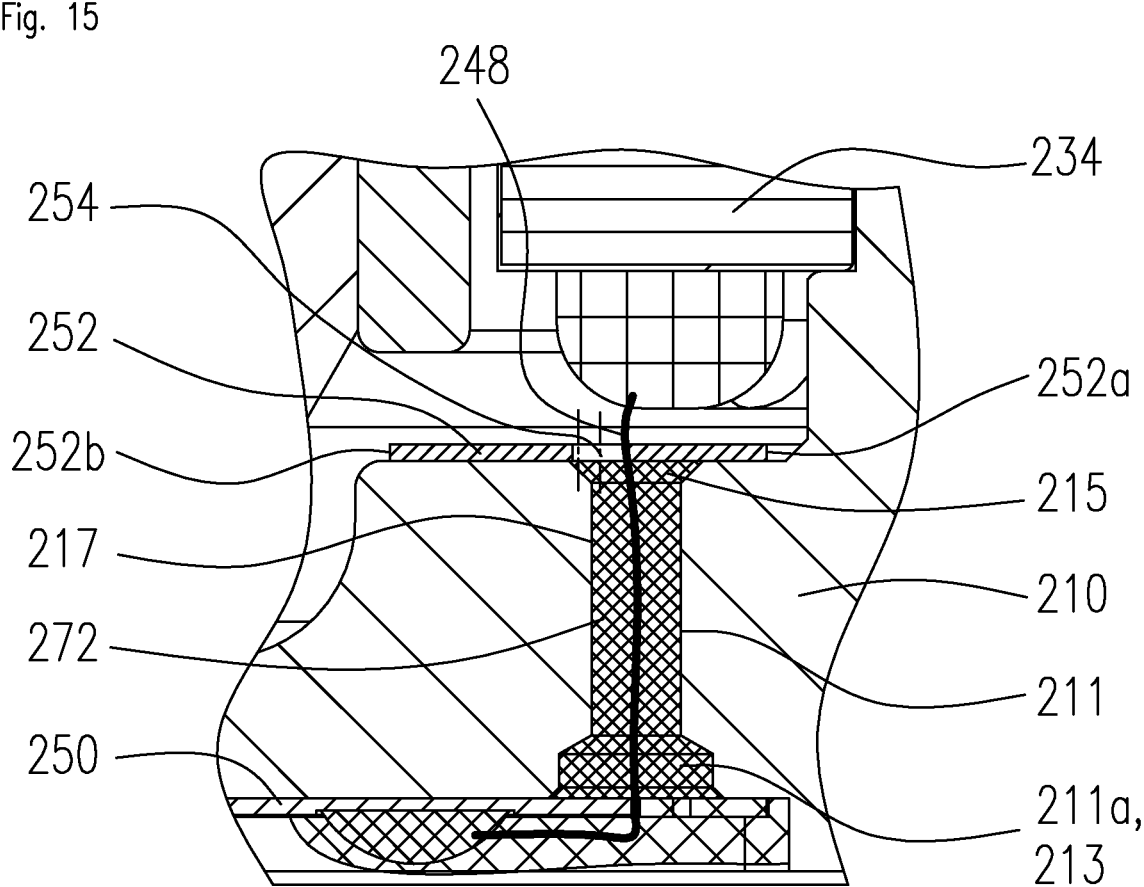
FIG. 15 shows a partial sectional view of the base plate with the insulating cover sheet of FIG. 14.

FIG. 15 shows a partial sectional view of the base plate 210 in the area of the through hole 211. The through hole 211 has an inside opening 215 which opens toward the top side 210a of the base plate 210, an outside opening 213 which opens toward the bottom side 210b of the base plate 210, and a cylindrical straight hole portion 217 provided between the inside opening 214 and the outside opening 213. The insulating cover sheet 252 of FIG. 14 is adhesively glued on the upper surface 210a of the base plate 210 directly beneath the stator assembly 134.

Each opening 154 of the insulating cover sheet 252 is arranged in such a manner that it is not aligned centrally with the through hole 211 of the base plate 210 but slightly offset to the left in the drawing.

This results in the lead wire 248 coming from the stator assembly 234 being adjacent to an inner right edge of the opening 254, wherein the edge of the opening 254 is positioned in such a manner that the lead wire 248 passes through the through hole 211 essentially centrally until it reaches the area of the printed circuit board 250, where the lead wire 248 is then electrically contacted. Herein, the printed circuit board 250 is positioned in analogous fashion so that the lead wire 248 is essentially centrally guided within the through hole 211. The lead wire 248 is then adjacent to the edge of the printed circuit board 250 and is soldered to a contact surface on the printed circuit board 250.

To the left of the lead wire 248, a free passage of the opening 254 remains, so that when the through hole 211 is closed off by a sealing material 272, which is performed from the bottom side of the base plate 210, air bubbles trapped between the molding material 272 and the insulating cover sheet 252 can be vented to the exposed opening of opening 254 to the top toward the stator assembly.

What is important is that the cross-sectional area of the opening 254 in the insulating cover sheet 252 is substantially larger than the cross-sectional area of the lead wire 248 so that the opening 254 is not fully filled by the lead wire 248.

Furthermore, the center axis 239 of the opening 254 of the insulating cover sheet 252 is preferably radially offset with respect to the center axis of the through hole 211 of the base plate 210.

Figure 16:
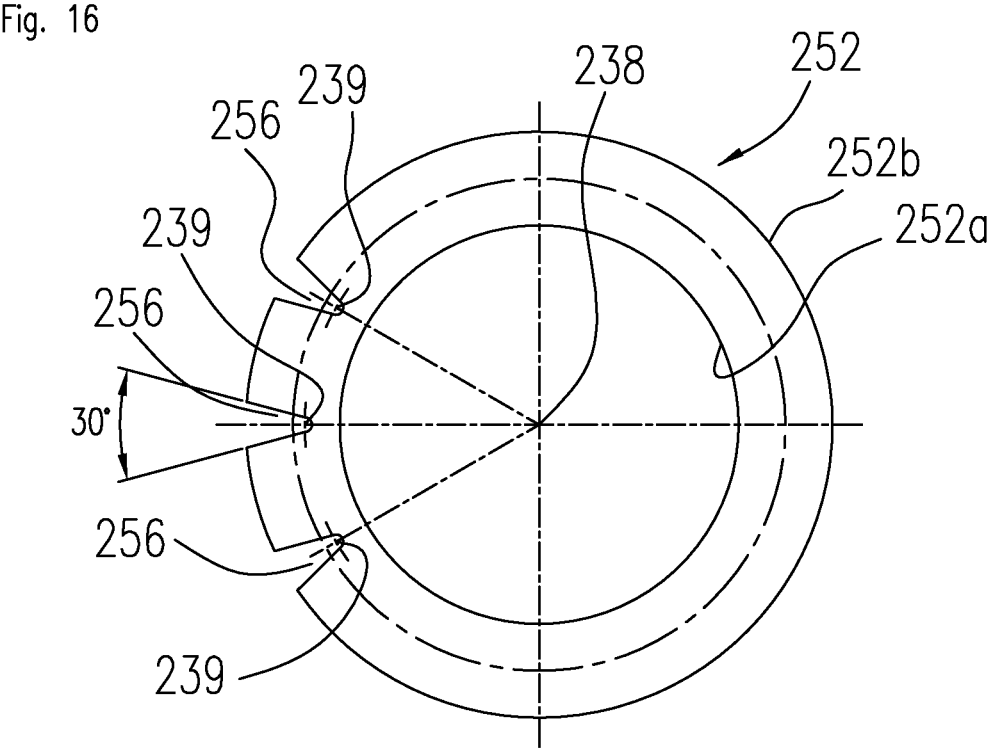
FIG. 16 shows a plan view of a further embodiment of the insulating cover sheet with notches.

FIG. 16 shows a further embodiment of an insulating cover sheet 252, wherein it can be seen that the insulating cover sheet 252 now has a plurality of notches 256 at the outer edge 252b instead of the openings in accordance with FIG. 14.

The notches 256 are formed to be V-shaped, for example, and extend from the outer edge 252b in the direction of the inner edge 252a of the insulating cover sheet 252 and preferably to beyond the middle between the inner edge 252a and the outer edge 252b. The V-shaped notch preferably forms an angle of 30° and is directed to the center of the insulating cover sheet 252.

Figure 17:
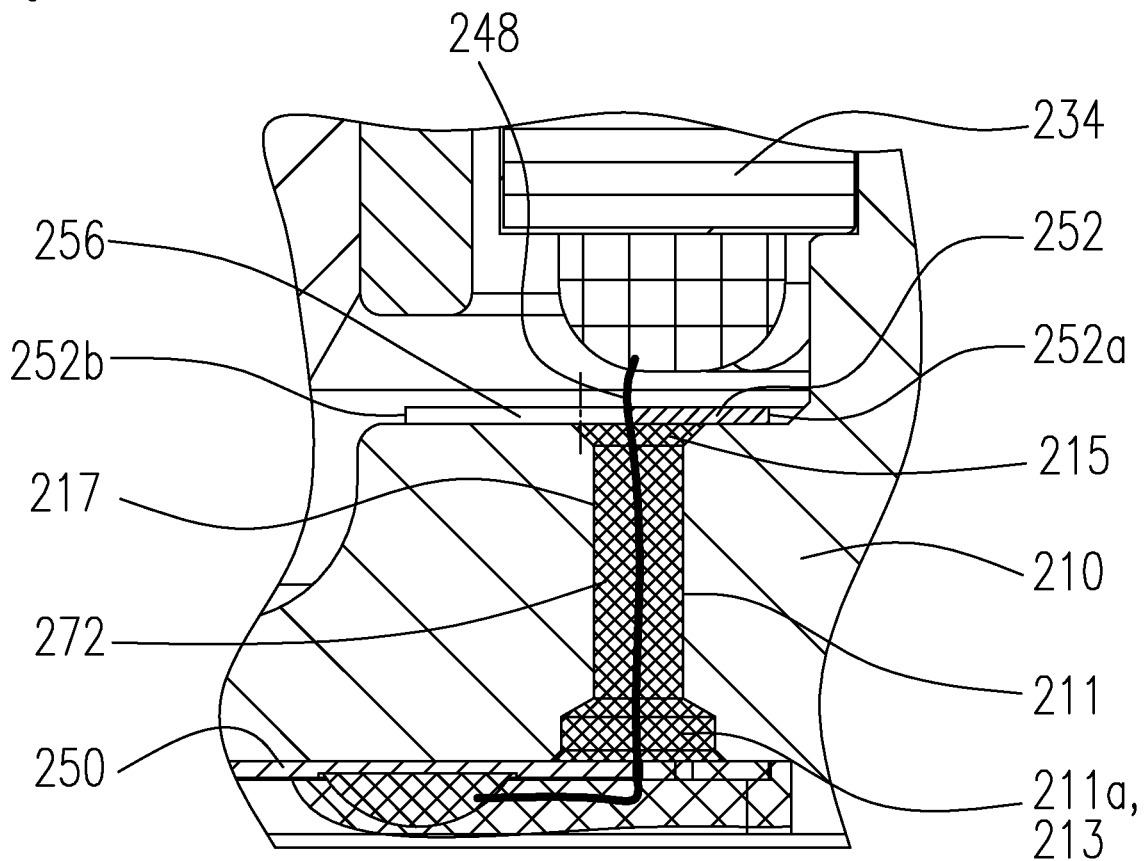
FIG. 17 shows a partial sectional view of the base plate with the insulating cover sheet of FIG. 16.

FIG. 17 shows a sectional view of the base plate 210 in the area of the through hole 211 and the insulating cover sheet 252 of FIG. 16 fixed thereon, which is arranged on the top side 210a of the base plate 210.

The insulating cover sheet 252 is arranged on the base plate in such a manner that the lead wire 248 coming from the stator assembly 234 comes to lie in the area of the bottom of the notch 256, i.e. at its innermost position, and preferably contacts this innermost point of the notch 256 so that it is centrally guided in the through hole 211 of the base plate 210, i.e. the through hole 211 is not fully closed off by the insulating cover sheet 252 but the V-shaped section of the notch 256 remains radially outward from the lead wire 248 in the direction towards the left so that any air present and possibly trapped in the through hole 211 can escape through the free cross-section of the notch 256 of the insulating cover sheet 252 to the top from the through hole 211.

Figure 18:
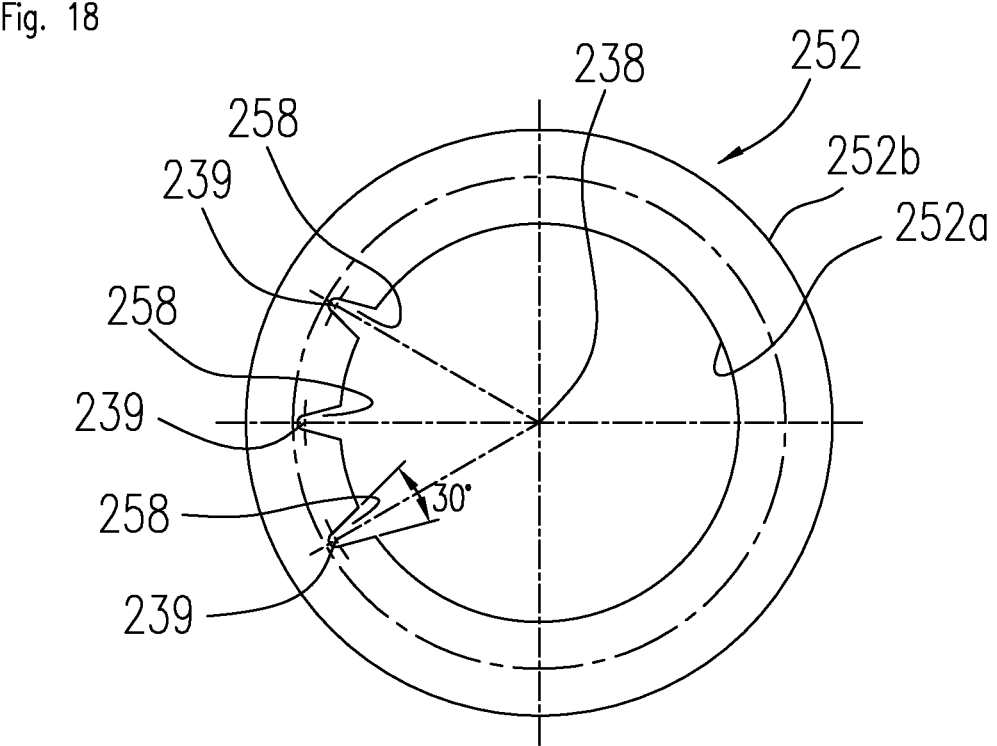
FIG. 18 shows a plan view of a further embodiment of the insulating cover sheet with notches.

FIG. 18 shows a further embodiment of the insulating cover sheet 252, wherein the plurality of approximately V-shaped notches 258 are provided at the inner edge 252a of the insulating cover sheet 252 and approximately reaching to the middle of the circular annular disc of the insulating cover sheet 252.

Figure 19:
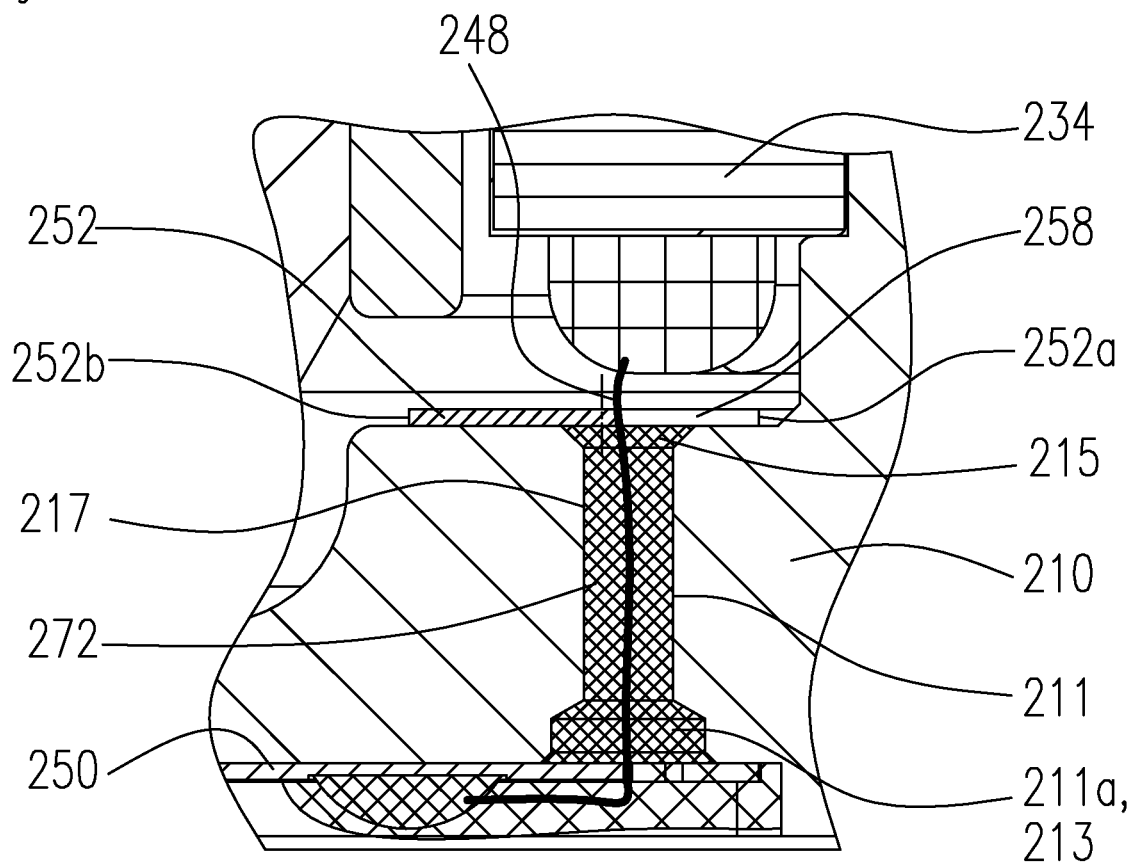
FIG. 19 shows a partial sectional view of the base plate with the insulating cover sheet of FIG. 18.

The notches 258 are associated with corresponding through holes 211 of the base plate 210, wherein, in FIG. 19, a partial sectional view of the base plate 210 is shown in the area of the through hole 211.

The insulating cover sheet 252 of FIG. 18 is fixed on the top side 201a of the base plate 210 in such a manner that the notches 258 come to lie over the through hole 211 in such a manner that the lead wire 248 is centrally guided in the associated through hole 211 by contacting, for example, the innermost position of the notch 258. The opening of the notch 258 is to the right of the lead wire 248 so that the through hole 211 is not fully closed off by the insulating cover sheet 252. By these means, any air trapped in the through hole 211 of the base plate 210 can escape from the through hole 211 via the notch 258.

FIG. 20 shows a further exemplary embodiment of the invention comprising an insulating cover sheet 252 which includes a plurality of elongate holes in the shape of oval-shaped openings 260 substantially centrally distributed over the circumference. The cross-sectional area of the oval-shaped openings 260 is substantially larger than the cross-sectional area of the lead wire 248 to be passed through, wherein the width of the elongate openings 260 is at least as large as the diameter of the lead wire 248.

FIG. 21 shows a cross-section of the base plate in the area of the through hole 211, wherein the insulating cover sheet 252 of FIG. 20 is fixed above the through hole 211. The elongate hole 260 is not centrally arranged on the through hole 211, but the lead wire 248 to be passed therethrough contacts the right edge of the oval-shaped opening 260, for example. The insulating cover sheet 252, or the oval-shaped opening is arranged in such a manner that the lead wire 248 is guided substantially centrally in the through hole 211 of the base plate 210. To the left of the lead wire 248, an opening area of the elongate opening 260 remains, which extends beyond the edge of the countersink of the through hole 211 and ensures that any air trapped in the through hole 211 can escape to the top through the oval-shaped opening 260.

FIG. 22 shows an embodiment, modified with respect to FIG. 20, of the insulating cover sheet 252, wherein the difference is only the size of the oval-shaped openings 262, which have a slightly smaller length than the oval-shaped openings 260 in FIG. 20.

Figure 23:
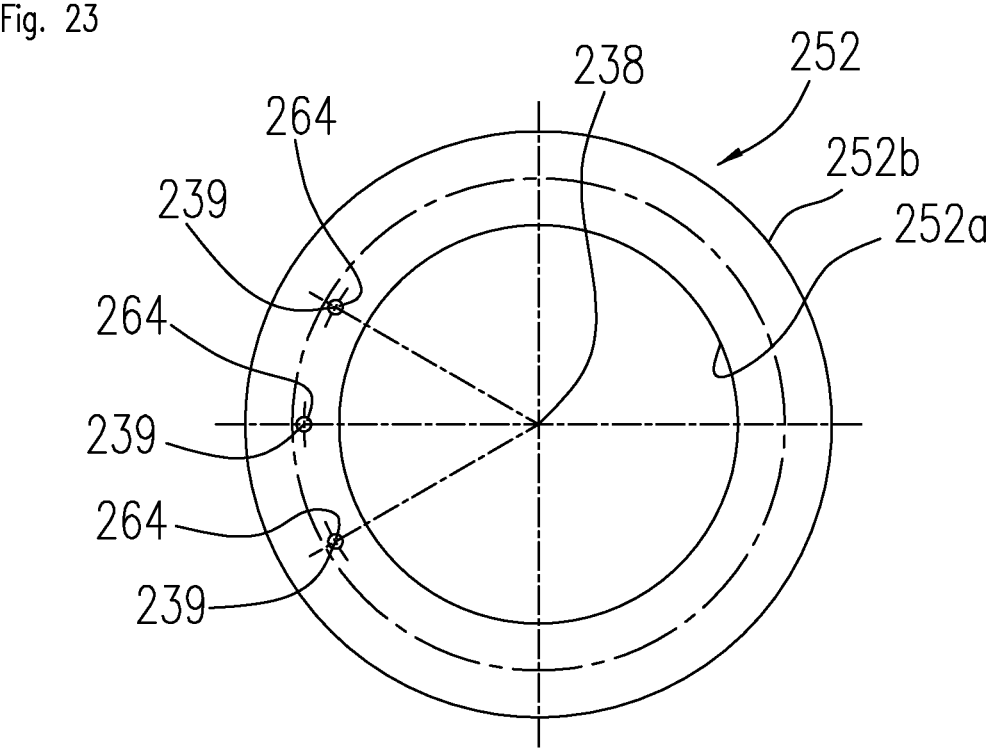
FIG. 23 shows a plan view of a further embodiment of the insulating cover sheet with openings.

FIG. 23 shows an embodiment of the insulating cover sheet 252 where, in a similar manner as in FIG. 14, circular openings 264 are used for passing through each of the lead wires 248. When compared to FIG. 14, the openings 264 are smaller in diameter in the insulating cover sheet 252 of FIG. 23, wherein the cross-sectional area of each opening 264 is, however, still at least twice the cross-sectional area of the respective lead wire 248 passing therethrough.

Figure 24:
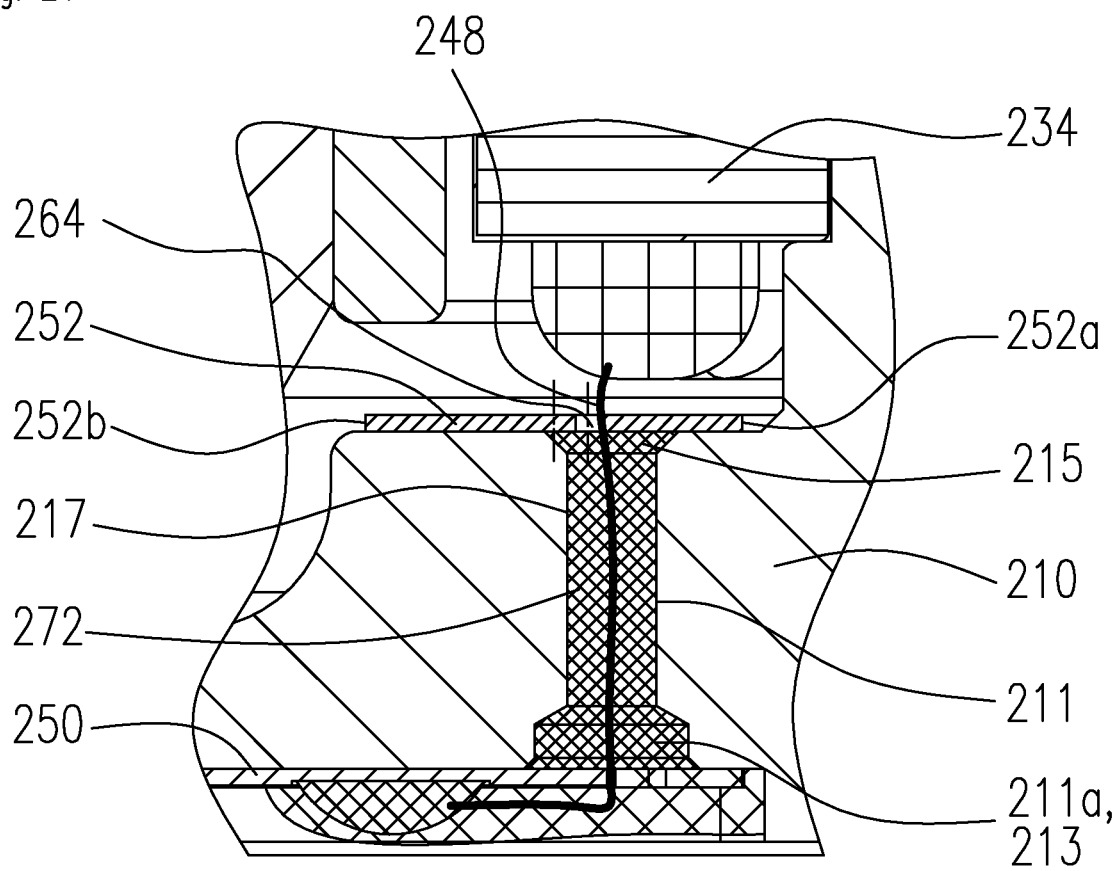
FIG. 24 shows a partial sectional view of the base plate with the insulating cover sheet of FIG. 23.

FIG. 24 shows a partial sectional view of the base plate 210 in the area of the through hole 211. To ensure that any air trapped in the through hole 211 due to closing off with insulating molding material 272 can escape from the through hole 211, the opening 264 of the insulating cover sheet 252 of FIG. 23 is preferably arranged offset with respect to the center point of the through hole 211 in such a manner that the lead wire 248 passing therethrough is in contact with the edge of the opening 264 of the insulating cover sheet 252. By these means, the lead wire 248 is securely centered in the through hole 211 of the base plate 210. At the same time, the opening 264 of the insulating cover sheet 252 extends to the left of the lead wire 248 to beyond the countersink of the through hole 211 and forms a free opening so that any air trapped in the through hole 211 can escape through this free opening of the opening 264.

Figure 25:
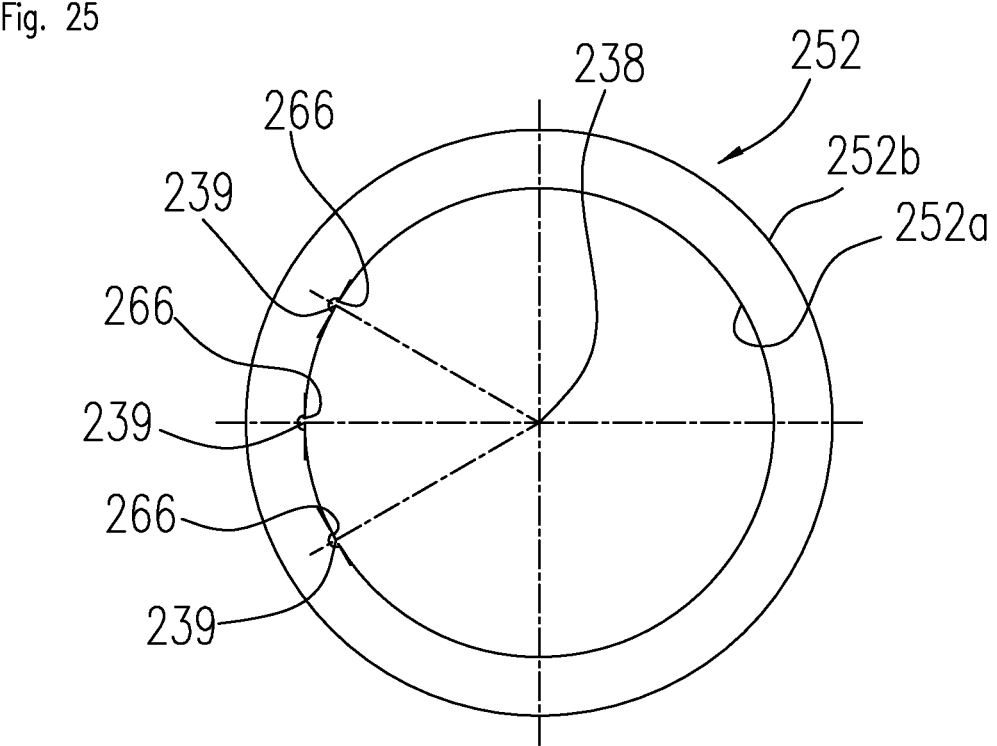
FIG. 25 shows a plan view of a further embodiment of the insulating cover sheet with notches.

FIG. 25 shows an insulating cover sheet 252 at the inner edge 252a of which half-circular recesses 266 are provided, which serve for receiving and guiding the lead wire 248.

Figure 26:
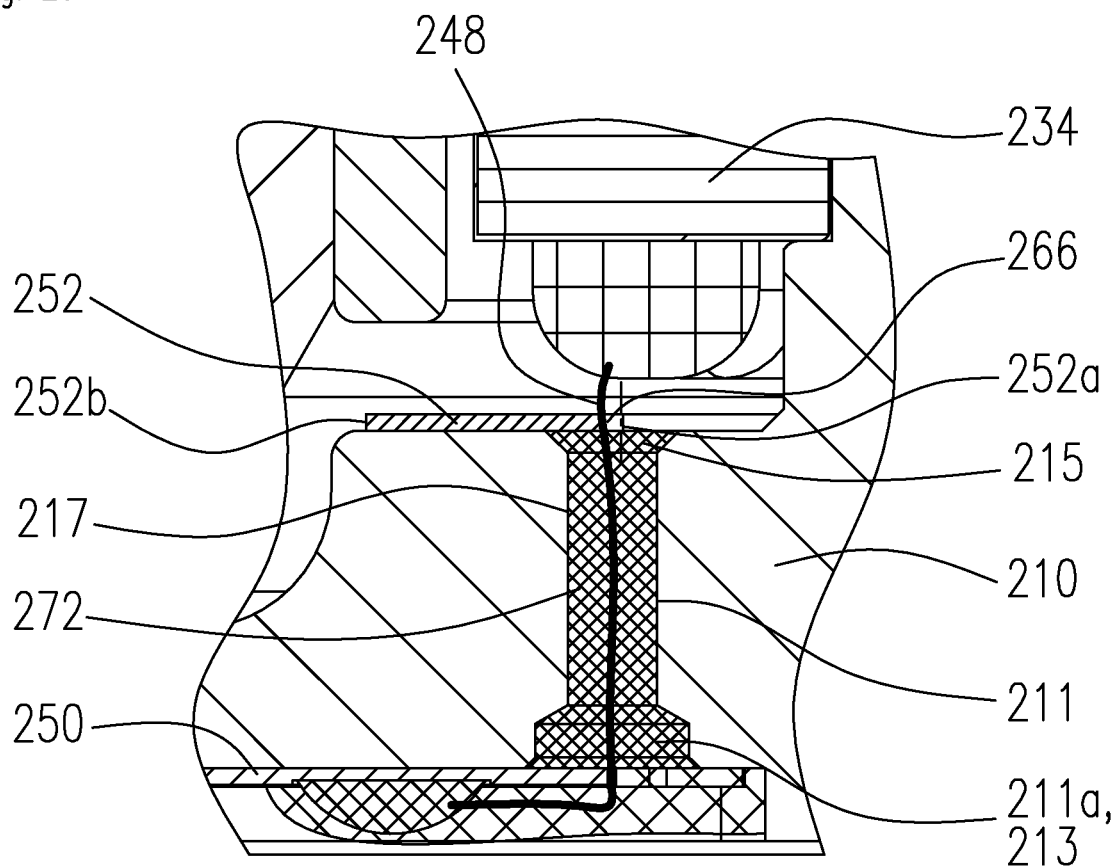
FIG. 26 shows a partial sectional view of the base plate with the insulating cover sheet of FIG. 25.

In the sectional view in accordance with FIG. 26 it can be seen that the insulating cover sheet 252 of FIG. 25 is arranged on the base plate 210 in such a manner that each lead wire 248 comes to lie in an associated recess 266 and is thereby centered in the through hole 211 of the base plate 210. The insulating cover sheet 252 only extends to slightly beyond half the through hole 211, wherein, to the right of the lead wire 248, the through hole 211 is not covered by the insulating cover sheet 252, but the through hole 211 remains open so that air can escape from the through hole 211.

Figure 27:
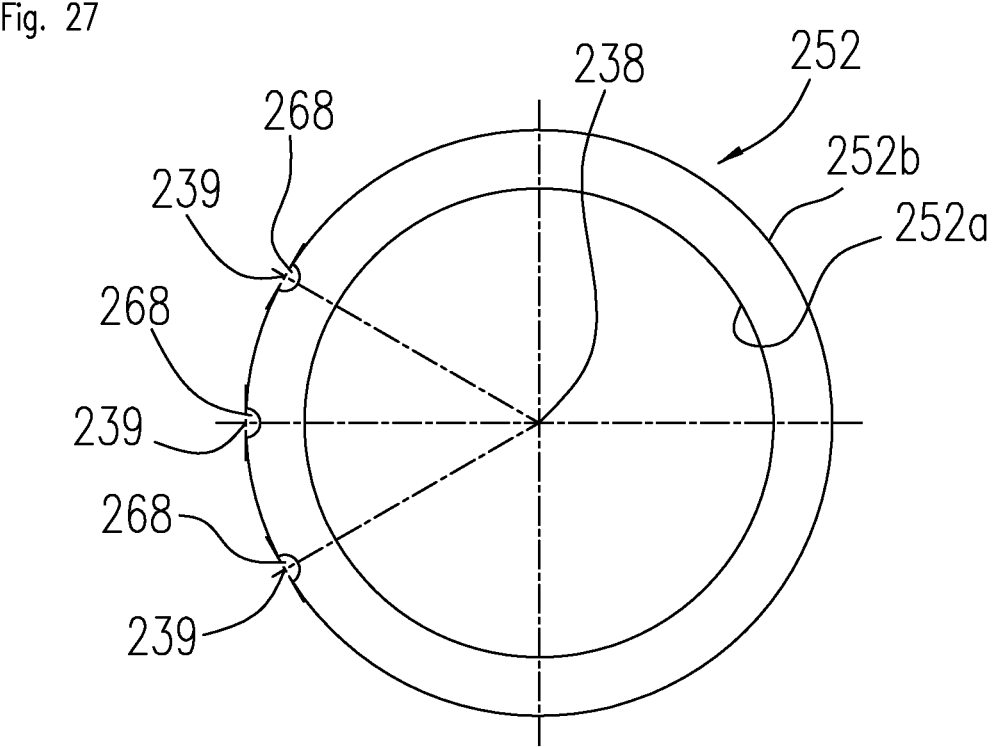
FIG. 27 shows a plan view of a further embodiment of the insulating cover sheet with notches.

FIG. 27 shows an insulating cover sheet 252, at the outer edge 252b of which half-circular recesses 268 are arranged to receive and guide the lead wire 248.

Figure 28:
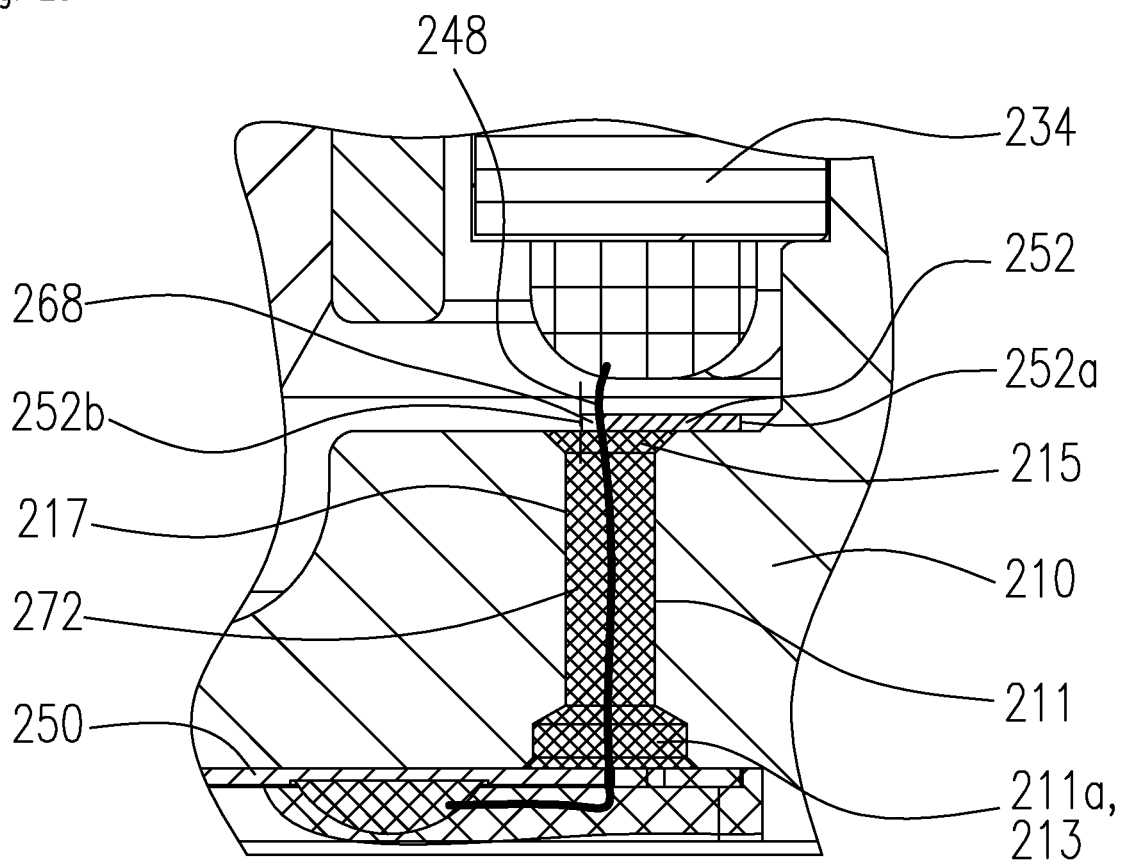
FIG. 28 shows a partial sectional view of the base plate with the insulating cover sheet of FIG. 27.

In the partial sectional view in accordance with FIG. 28, it can be seen that the insulating cover sheet 252 of FIG. 27 extends from the right up to the lead wire 248, wherein the lead wire 248 is fixed in the half-circular recess 268 in such a manner that it can be centrally guided through the through hole 211, without touching the edges of the through hole 211. To the left of the lead wire 248, the through hole 211 of the base plate 210 remains free so that air can escape from the through hole 211.

Figure 29:
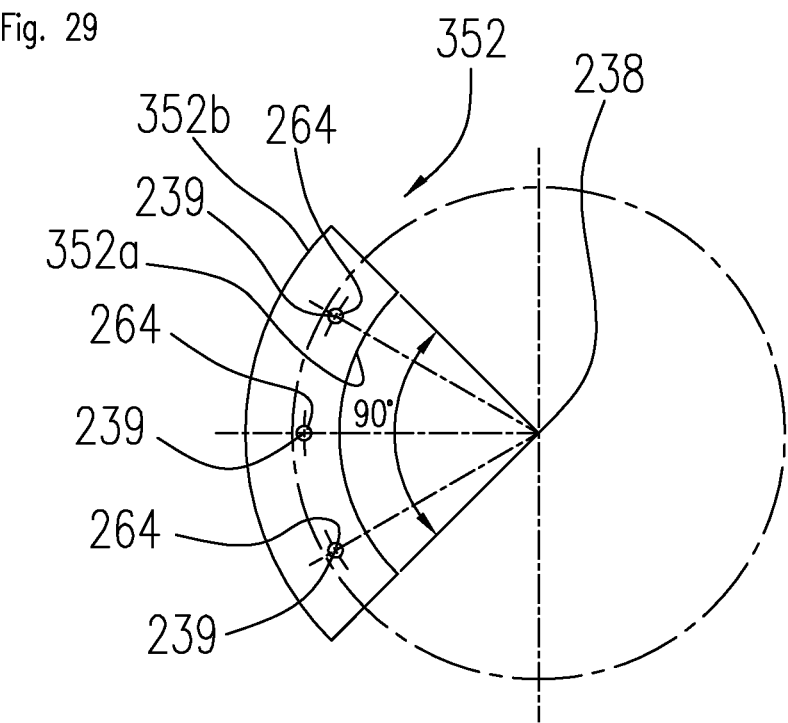
FIG. 29 shows a plan view of a further embodiment of the insulating cover sheet in the form of a ring segment.

FIG. 29 shows an exemplary embodiment, in which the insulating cover sheet 352 is formed as a ring segment, having an inner edge 352a and an outer edge 352b. The ring segment can extend, for example, over an angle of 90°.

According to the invention, all embodiments of the insulating cover sheet described, which can comprise holes, elongate holes, notches or recesses, can be in the form of such a ring segment.

Figure 30:
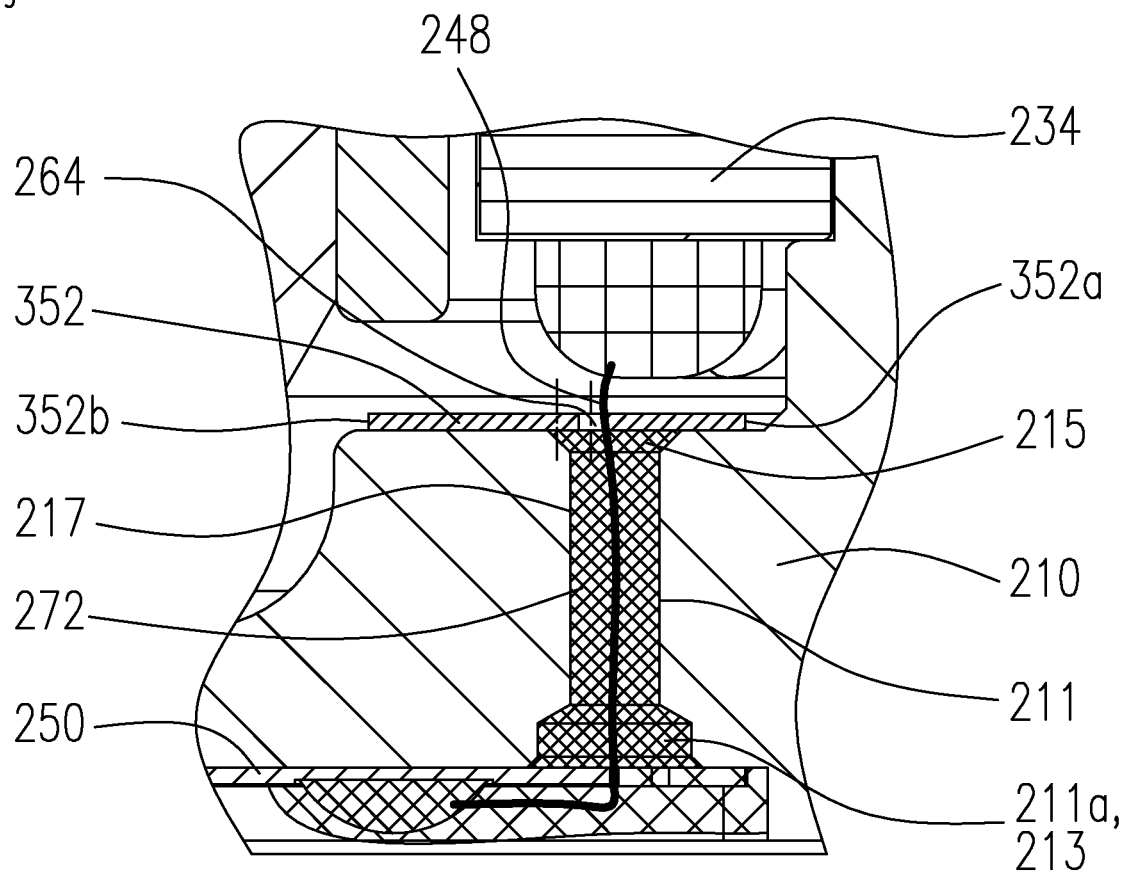
FIG. 30 shows a partial sectional view of the base plate with the insulating cover sheet of FIG. 29.

In accordance with FIG. 30, the insulating cover sheet 352 of FIG. 29 is placed beneath the stator assembly 234 in such a manner that its openings, for example formed as circular openings 264, come to lie above the through holes 211 of the base plate 210.

In a similar manner as in FIG. 24, each lead wire 248 passes through an opening 264 of the insulating cover sheet 352 and is in contact with the right edge of the opening 264 so that the lead wire 248 extends centrally through the through hole 211 of the base plate 210 without touching the side wall of the base plate 210.

To the left of the lead wire 248, a free space of the opening 264 remains, through which air can escape from the through hole 211, which may be trapped in the through hole 211 during filling the through hole 211 with a molding sealing material 72.

The invention claimed is:

1. A spindle motor comprising:
a stationary motor component and a rotatable motor component, which are supported to be rotatable with respect to each other by means of a bearing system,
a base plate having a top side and a bottom side, and on which a through hole is formed,
a stator assembly provided at a top side of the base plate having a stator core wound with a stator winding,
a circuit board provided at a bottom side of the base plate, and to which a lead wire of the stator winding drawn from the through hole to the outside is connected,
an insulating cover sheet provided at the inside of the base plate for covering the through hole, the insulating cover sheet being passed through by the lead wire, and
a sealing material filling the through hole, wherein the insulating cover sheet has a wire hole and an air vent part, communicating with the through hole, wherein the air vent part faces at least a portion of an inside opening of the through hole, wherein the wire hole and the air vent part are connected to form an opening, and an edge of this opening of the insulating cover sheet is positioned above the center of the associated through hole of the base plate, and wherein the lead wire is in contact with and guided by this edge of the opening.

2. A hard disk drive comprising a spindle motor according to claim 1.

3. The spindle motor according to claim 1, wherein the wire hole and the air vent part are connected to form an opening.

4. The spindle motor according to claim 1, wherein the inside opening of the through hole is a chamfered portion or a counterbore portion.

5. The spindle motor according to claim 1, wherein the sealing material exists in the air vent part of the insulating cover sheet.

6. The spindle motor according to claim 1, wherein the wire hole and the air vent part are connected to form an opening, and the cross-sectional area of this opening of the insulating cover sheet corresponds to at least double the cross-sectional area of the lead wire passing therethrough.

7. A spindle motor comprising:
a stationary motor component and a rotatable motor component, which are supported to be rotatable with respect to each other by means of a bearing system,
a base plate having a top side and a bottom side, and on which a through hole is formed,
a stator assembly provided at a top side of the base plate having a stator core wound with a stator winding,
a circuit board provided at a bottom side of the base plate, and to which a lead wire of the stator winding drawn from the through hole to the outside is connected,
an insulating cover sheet provided at the inside of the base plate for covering the through hole, the insulating cover sheet being passed through by the lead wire, and a sealing material filling the through hole, wherein the insulating cover sheet has a wire hole and an air vent part, communicating with the through hole, wherein the air vent part faces at least a portion of an inside opening of the through hole, and wherein the wire hole and the air vent part are connected to form an opening, and a center axis of this opening of the insulating cover sheet is arranged offset with respect to a center axis of the associated through hole of the base plate.

8. A hard disk drive comprising a spindle motor according to claim 7.

9. The spindle motor according to claim 7, wherein the inside opening of the through hole is a chamfered portion or a counterbore portion.

10. The spindle motor according to claim 7, wherein the sealing material exists in the air vent part of the insulating cover sheet.

11. The spindle motor according to claim 7, wherein the wire hole and the air vent part are connected to form an opening, and the cross-sectional area of this opening of the insulating cover sheet corresponds to at least double the cross-sectional area of the lead wire passing therethrough.

12. The spindle motor according to claim 7, wherein the insulating cover sheet is formed as a circular ring or a ring segment, and has an inner edge and an outer edge.

13. The spindle motor according to claim 7, wherein the wire hole and the air vent part are connected to form an opening, and this opening in the insulating cover sheet is formed as a circular or oval-shaped opening.

14. The spindle motor according to claim 7, wherein the wire hole and the air vent part are connected to form an opening, and this opening in the insulating cover sheet is formed as a cutout, a slit, a notch or a recess.

15. A spindle motor comprising:
a stationary motor component and a rotatable motor component, which are supported to be rotatable with respect to each other by means of a bearing system,
a base plate having a top side and a bottom side, and on which a through hole is formed,
a stator assembly provided at a top side of the base plate having a stator core wound with a stator winding,
a circuit board provided at a bottom side of the base plate, and to which a lead wire of the stator winding drawn from the through hole to the outside is connected,
an insulating cover sheet provided at the inside of the base plate for covering the through hole, the insulating cover sheet being passed through by the lead wire, and a sealing material filling the through hole, wherein the insulating cover sheet has a wire hole and an air vent part, communicating with the through hole, wherein the air vent part faces at least a portion of an inside opening of the through hole, and wherein the insulating cover sheet is formed as a circular ring or a ring segment and has an inner edge and an outer edge, and a plurality of radially outwardly extending notches or recesses are provided at the inner edge of the insulating cover sheet, and are positioned in such a way that each notch or recess is associated with one through hole of the base plate and comes to lie above the associated through hole.

16. A hard disk drive comprising a spindle motor according to claim 15.

17. The spindle motor according to claim 15, wherein the wire hole and the air vent part are connected to form an opening.

18. A spindle motor comprising:
a stationary motor component and a rotatable motor component, which are supported to be rotatable with respect to each other by means of a bearing system,
a base plate having a top side and a bottom side, and on which a through hole is formed,
a stator assembly provided at a top side of the base plate having a stator core wound with a stator winding,
a circuit board provided at a bottom side of the base plate, and to which a lead wire of the stator winding drawn from the through hole to the outside is connected,
an insulating cover sheet provided at the inside of the base plate for covering the through hole, the insulating cover sheet being passed through by the lead wire, and a sealing material filling the through hole, wherein the insulating cover sheet has a wire hole and an air vent part, communicating with the through hole, wherein the air vent part faces at least a portion of an inside opening of the through hole, and wherein the insulating cover sheet is formed as a circular ring or a ring segment, and has an inner edge and an outer edge, and a plurality of radially inwardly extending cutouts, slits, notches or recesses are provided at the outer edge of the insulating cover sheet, and are positioned in such a way that each cutout, slit, notch or recess is associated with one through hole of the base plate and comes to lie above the associated through hole.

19. A spindle motor comprising:
a stationary motor component and a rotatable motor component, which are supported to be rotatable with respect to each other by means of a bearing system,
a base plate having a top side and a bottom side, and on which a through hole is formed,
a stator assembly provided at a top side of the base plate having a stator core wound with a stator winding,
a circuit board provided at a bottom side of the base plate, and to which a lead wire of the stator winding drawn from the through hole to the outside is connected,
an insulating cover sheet provided at the inside of the base plate for covering the through hole, the insulating cover sheet being passed through by the lead wire, and a sealing material filling the through hole, wherein the insulating cover sheet has a wire hole and an air vent part, communicating with the through hole, wherein the air vent part faces at least a portion of an inside opening of the through hole, and wherein the wire hole and the air vent part are connected to form an opening, and each lead wire is guided in the opening of the insulating cover sheet and is thus positioned with respect to the associated through hole of the base plate.

20. A spindle motor comprising:
a stationary motor component and a rotatable motor component, which are supported to be rotatable with respect to each other by means of a bearing system,
a base plate having a top side and a bottom side, and on which a through hole is formed,
a stator assembly provided at a top side of the base plate having a stator core wound with a stator winding,
a circuit board provided at a bottom side of the base plate, and to which a lead wire of the stator winding drawn from the through hole to the outside is connected,
an insulating cover sheet provided at the inside of the base plate for covering the through hole, the insulating cover sheet being passed through by the lead wire, and a sealing material filling the through hole, wherein the insulating cover sheet has a wire hole and an air vent part, communicating with the through hole, wherein the air vent part faces at least a portion of an inside opening of the through hole, and wherein the wire hole and the air vent part are connected to form several openings, and these openings of the insulating cover sheet are arranged on a circular arc and are spaced with respect to each other.

* * * * *